Feb. 24, 1959 W. G. EDWARDS 2,874,902

DIGITAL ADDING DEVICE

Filed May 14, 1954 7 Sheets-Sheet 1

INVENTOR:
Walter G. Edwards
By Louis A. Kline
John T. Matlago, Agent
His Attorneys Feb. 24, 1959 W. G. EDWARDS 2,874,902

DIGITAL ADDING DEVICE

Filed May 14, 1954 7 Sheets-Sheet 2

INVENTOR:
Walter G. Edwards
By Carl Berst
Louis A. Kline
John J. Matlago, agent
His Attorneys Table III

| | | |
|---|---|---|
| Flip-Flop | | S1 |
| Stage | | $2^0$ |
| Decimal Content of Summer | 0 | 0 |
| | 1 | 1 |

Table IV

| | | | |
|---|---|---|---|
| Flip-Flop | | S1 | S2 |
| Stage | | $2^1$ | $2^0$ |
| Decimal Content of Summer | 0 | 0 | 0 |
| | 1 | 0 | 1 |
| | 2 | 1 | 0 |
| | 3 | 1 | 1 |

INVENTOR:
Walter G. Edwards
By Earl Benst
Louis A Kline
John J. Matlago, Agent
His Attorneys

DIGITAL ADDING DEVICE

Filed May 14, 1954 7 Sheets-Sheet 4

Table V

| Flip-Flop | S1 | S2 | S3 |
|---|---|---|---|
| Stage | $2^2$ | $2^1$ | $2^0$ |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Table VI

| Flip-Flop | S1 | S2 | S3 | |
|---|---|---|---|---|
| Stage | $2^3$ | $2^2$ | $2^1$ | $2^0$ |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

INVENTOR:
Walter G. Edwards
Earl Bent
By Louis A. Kline
John J. Matlago, Agent
His Attorneys

DIGITAL ADDING DEVICE

Filed May 14, 1954 7 Sheets-Sheet 5

INVENTOR:
Walter G. Edwards
Earl Benst
Louis A Kline
By John J. Matlago, Agent
His Attorneys INVENTOR:
Walter G. Edwards
Hoare Burst
Louis A Kline
By John J. Matlago, Agent
His Attorneys Feb. 24, 1959 W. G. EDWARDS 2,874,902

DIGITAL ADDING DEVICE

Filed May 14, 1954 7 Sheets-Sheet 7

INVENTOR:
Walter G. Edwards
Earl Benst
Louis A Kline
By John T. Matlago, Agent
His Attorneys United States Patent Office 2,874,902
Patented Feb. 24, 1959

2,874,902

DIGITAL ADDING DEVICE

Walter G. Edwards, Hermosa Beach, Calif., assignor, by mesne assignments, to The National Cash Register Company, a corporation of Maryland Application May 14, 1954, Serial No. 429,782

9 Claims. (Cl. 235—164)

The present invention relates to electronic digital adding circuits and more particularly to a novel adding means for operating on numbers expressed in binary-coded-decimal systems.

It is well known in the prior art that computers can be most readily constructed for operating on numbers expressed in the binary number system. However, it is most desirable to operate with numbers expressed in the conventional decimal number systems, and so binary-coded-decimal systems, which combine both of these advantages, are now preferably employed in digital computers. A decimal digit may be represented in these systems, for example, by a block of four binary digits. By noting the absence or presence of binary digit "ones" in each of the four digit positions of a block, the magnitude of the decimal digit is determined.

It has previously been shown how a circuit can be devised for summing pairs of binary-coded-decimal numbers by utilizing bistable state elements responsive to logical networks which are defined by equations using the notation of Boolean algebra. The circuit of the present invention represents an improvement over the known circuits for serially adding binary-coded-decimal numbers by substantially reducing the amount of equipment required to perform this function. In addition, the circuit of the present invention employs a system which enables the logical networks to be resolved into arrangements which are simpler and more readily understood by those servicing the equipment. This is highly advantageous, because the problem of checking out the circuits and testing their operation is of prime consideration in complex computer systems of this type.

Briefly, the present invention provides for summing a pair of binary-coded-decimal numbers by the use of three bistable state circuits which efficiently store information needed during the four pulse periods constituting a cycle of operation. The bistable state circuits are successively introduced to function as stages of a conventional binary counter during the first three periods of a cycle. The mode of operation, however, provides for each bistable state circuit representing a progressively higher order stage of the binary counter on each of these successive pulse periods. Commencing with the third pulse period of a cycle, the circuits provide for transforming the accumulated binary number count into the sum digit represented in the same binary-coded-decimal system employed by the incoming digits.

It is accordingly an object of this invention to provide a novel electronic means and method for serially responding to two numbers represented in a binary-coded-decimal system and emitting their sum represented in the same coded decimal system.

It is another object of this invention to provide a novel electronic means for summing two coded decimal numbers in which a time variable storage means is used together with a minimum of circuitry components for efficient storage of information as needed during the operation.

It is another object of this invention to provide a novel electronic means and method for serially summing coded decimal numbers by changing the weight assigned to bistable state storage units of a binary counter in accordance with the assigned weights of the inputs.

It is still another object of this invention to provide a novel system for serially adding pairs of binary-coded-decimal digits which enables the logical networks for triggering the bistable state circuits to be the same for the first three pulse periods of a summation cycle.

More particularly, the summing circuit of the present invention is comprised of bistable state devices, such as flip-flop circuits, and an associated control network. The two waveform patterns representing the numbers to be summed are serially fed into the control network which has a cycling action controlled by clock pulse inputs fed in from another source. The output waveform pattern from the summer represents the number corresponding to the sum of the input numbers and is indicated by the same code used for expressing the inputs.

The control network for the flip-flops operates according to a set of logical equations. Each of the equations defines when and how a flip-flop will change its state. The outputs of the flip-flops, together with the input waveforms, correspond to the terms of the equations which are combined by logical multiplication or logical addition operations. These operations are physically performed by networks comprising arrangements of diodes and resistors which interconnect the lines carrying the voltages representative of the terms. The clock pulses are used for synchronizing and effectively advancing the summing circuit in order to carry out the process. Whenever, as the result of a clock pulse actuation, the terms of the network are made proper to satisfy a control input to a flip-flop, the logical multiplication of this control input with the next clock pulse causes the flip-flop to change, unless it is already in the state controlled by the input, in which event it remains in that state.

The cycling action of the summer circuit corresponds to the receipt of four successive binary digits which define a decimal block. An auxiliary set of flip-flops is arranged to successively count clock pulses and emit potentials representative of the four cycle counts.

Thus, it can be stated that the electrical status of the logical networks, and consequently the flip-flops themselves, change in response to voltages (terms) representing digit inputs, the states of the flip-flops following the previous clock pulse actuation, and the step of the cycle through which the summer advances.

The invention will be more clearly understood by the following detailed description of a preferred form of the invention taken together with the accompanying drawings forming a part of this specification in which.

*General description*

Figure 1:
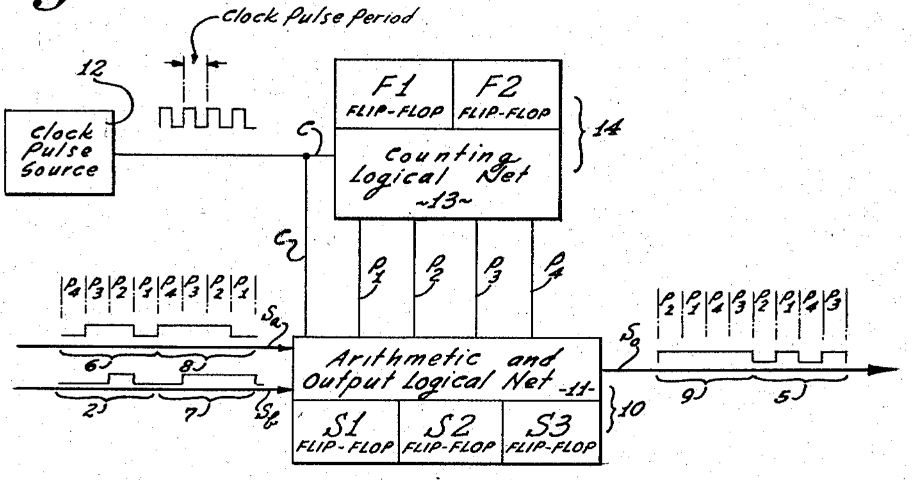
Fig. 1 is a schematic block diagram showing generally the arrangement of the preferred embodiment of the summer circuit.

Referring first to Fig. 1, a block diagram shows the general arrangement of the present invention. The summer 10 is comprised of flip-flops S1, S2, and S3 with an arithmetical and output logical network 11. The potential waveforms appearing on inputs $S_a$ and $S_b$ represent coded decimal numbers which are to be added in the summer 10. The waveform appearing on output $S_0$ represents the sum of the inputs.

A clock pulse source 12 continuously emits square waves which determine the clock pulse periods P. A clock pulse period is the interval between the trailing edge of one clock pulse and the trailing edge of the succeeding clock pulse. These clock periods are used for determining the time allocated to a binary digit which is manifested, for example, by the potential output from a flip-flop. A high potential output on, say, the right plate connection of a flip-flop during a period manifests the binary digit "one," and a low potential output thereon manifests the binary digit "zero."

Since a decimal digit is represented in the present invention by a group or block of four binary digits, the presence or absence of a high potential on inputs $S_a$ or $S_b$ during each of four consecutive clock pulse periods must be observed. Pulse period counter 14, counting clock pulses from clock source 12, defines the appearance of the particular binary digits in a decimal block. This is accomplished by outputs from the counting logical network 13 which, together with flip-flops F1 and F2, constitute the counter 14. The outputs from counter 14 emit potentials manifesting counts $P_1$, $P_2$, $P_3$, $P_4$, $P_1$, $P_2$, $P_3$, $P_4$, etc. in a cyclical manner. The count potential which is high during a given clock period indicates which particular binary digit of a decimal block is being observed at the input of summer 10.

Figure 2:
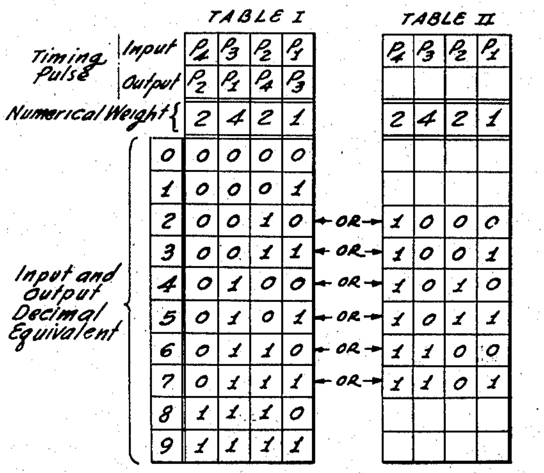
Fig. 2 is a binary table showing the four place code representing each of the decimal digits.

Table I of Fig. 2 shows the binary code used for representing the decimal digits. The timing pulses $P_1$, $P_2$, $P_3$, and $P_4$ for the input, and $P_3$, $P_4$, $P_1$, and $P_2$ for the output, together with the numerical weight associated with these pulse periods, 1, 2, 4, 2, respectively, define the columns of the table. The decimal equivalent of the binary code in each horizontal row is thus obtained in the table by totaling the effective components of the decimal digit as indicated by the binary "1" in the appropriate columns. It should be noted that the decimal digit equivalents 2, 3, 4, 5, 6, and 7 can be represented by two different code combinations. The code presented in Table II of Fig. 2 is obtained as the result of inverting a waveform to obtain a code of the complement as desired when performing a subtraction. As will be brought out in the ensuing description, the magnitude of an input decimal digit can be represented by either code combination, and the summing circuit will be able to operate correctly. However, it should be understood that the output decimal digit is always represented by the code in Table I.

Referring back to Fig. 1, it will now be broadly described how the summer 10 operates to add the binary-coded-decimal number 68 appearing on input $S_a$ to the binary-coded-decimal number 27 appearing simultaneously on input $S_b$.

In Table I of Fig. 2, the decimal digit 8 is defined by a binary digit "zero" in pulse position $P_1$, while pulse positions $P_2$, $P_3$, and $P_4$ are defined by binary digit "one." Thus in Fig. 1, a relatively low potential is impressed on input $S_a$ during the $P_1$ period, and a relatively high potential is impressed on $S_a$ during the $P_2$, $P_3$, and $P_4$ periods. The decimal digit 6, which immediately follows the decimal digit 8 on input $S_a$, is seen from Table I to consist of a binary digit "zero" for the $P_1$ pulse period, followed by the binary digit "one" during the $P_2$ and $P_3$ pulse periods, and finally a binary digit "zero" during the $P_4$ period. Hence a relatively low potential exists for the $P_1$ pulse period on $S_a$, followed by a relatively high potential during the $P_2$ and $P_3$ pulse periods, and finally a relatively low potential during the $P_4$ pulse period. In a similar manner the decimal number 27 is recognized on input $S_b$.

The input binary digits in each block are serially fed into the summer 10 in the same order in which the count potentials $P_1$, $P_2$, $P_3$, and $P_4$ are energized. These count potentials synchronize and program the nature of the summer 10 so that it gives each coded binary input digit its proper weight, and emits the sum coded binary digits in order at the proper pulse periods. The sum waveform $S_0$ is shown to be represented by the waveform manifestation of the decimal number 95. As indicated in Fig. 1, the output waveform $S_0$ is shifted by two pulse periods, i. e., it is late by two pulse counts of counter 14, in that the four binary digits of the outgoing decimal block, when referred to the input timing pulse counts, are now recognized to be in positions $P_3$, $P_4$, $P_1$, and $P_2$, respectively. This is because there is an inherent two clock pulse period delay in the present embodiment with which the corresponding sum coded binary digits are emitted from the summer 10.

Before going into a description of the details of the circuitry, the convention employed for presenting the system of thought of the present invention will be explained.

Logical propositions may be considered to be represented in the circuits by flip-flops which are electronic devices having two, and only two, possible steady state conditions. One of these conditions is referred to as "true" (in tables sometimes represented as "1") and the other condition is referred to as "false" (in tables as "0").

The true and false conditions of a proposition are preferably referred to as terms which are physically represented in the circuits as a D. C. voltage at a point. This voltage can exist at either of two D. C. levels. When a term is effective, the voltage is relatively high ($E_h$); and when the term is ineffective, the voltage is relatively low ($E_l$) (see Fig. 5).

Thus, by connecting output lines, for example, to each of the plates of the tubes in a flip-flop circuit, the output line having the relatively high potential determines the effective state (or term) of the flip-flop. The other output line having the relatively low potential then represents the ineffective state.

In accordance with the present scheme, it is desirable to be able to trigger a proposition flip-flop to either its true or false state by signals applied on separate inputs. These input lines are coupled to the grids of each of the tubes of the flip-flop circuit; hence by applying a negative pulse to the proper input line, the flip-flop circuit can be triggered to the desired status.

The nomenclature used for the present invention employs combinations of capital letters and numbers for designating the proposition flip-flops themselves. The outputs of the flip-flops are characterized by corresponding capital letters with the associated number shown as a subscript. In order to characterize the true state output of a flip-flop circuit from the false, the latter is distinguished from the former by an affixed prime.

On the other hand, the pair of inputs to a flip-flop are designated by corresponding lower case letters with the associated number shown as a subscript. The input for rendering a flip-flop false is distinguished from the other input by a subscript zero prefixing the lower case letter.

*Pulse period counter*

Figure 3:
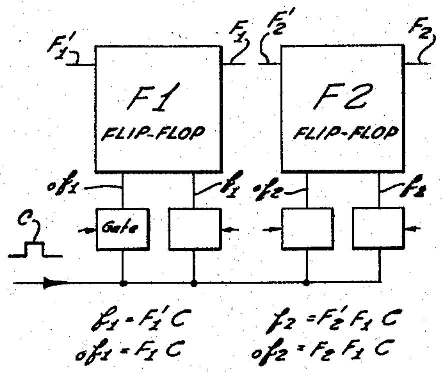
Fig. 3 is a block diagram of the pulse period counter together with the logical equations defining the triggering inputs for each of the flip-flop stages.

Referring next to Fig. 3, the flip-flops F1 and F2 comprising the stages of the pulse period counter are schematically illustrated.

In accordance with the present invention, the outputs of the flip-flops are connected to the inputs to cause the pulse period counter to count through a cycle of four consecutive counts, namely, $P_1$, $P_2$, $P_3$, and $P_4$.

The counter arrangement is a parallel one in that a C pulse from the clock pulse source 12 is applied on all flip-flop inputs simultaneously. The gating interconnections of the flip-flop outputs, however, only allow certain flip-flops to be triggered by the successive C pulses so as to change their states in an orderly fashion to indicate the cycle counts.

Figure 4:
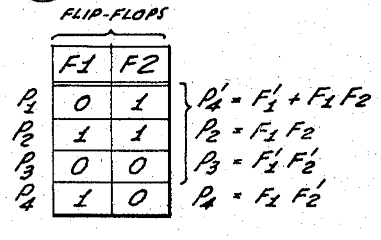
Fig. 4 is a binary table showing the states of the F flip-flops characteristic of the pulse period count.

In Fig. 4, the combinations of the states of the flip-flops which indicate the digital content of the counter are shown by a table. This table is a binary representation of the pulse counts $P_1$ through $P_4$.

On examining the states of the F flip-flops, when desiring to make the F1 flip-flop true, i. e., when it is desired to have the F1 flip-flop store a "one" therein on occurrence of the next C pulse, it is noted that the F1 flip-flop must presently have a "zero" therein, i. e., it must be in a false state. Similarly the F1 flip-flop must be in a true state in order to be switched to a false state on the next C pulse.

It is thus noted that the F1 flip-flop changes its state every time a clock pulse is fed out of clock pulse source 12.

Figure 5:
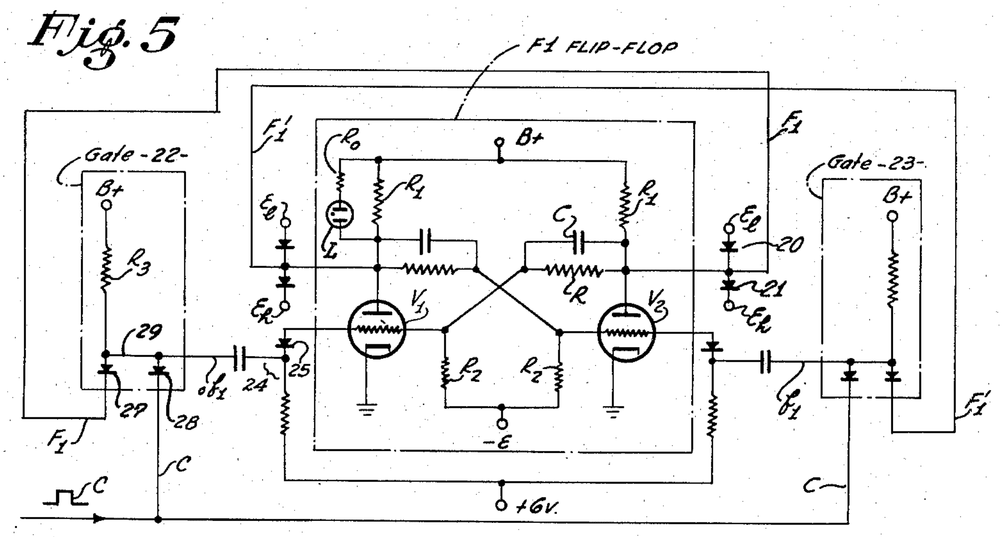
Fig. 5 is a detailed circuit diagram of a typical flip-flop circuit, e. g., the F1 flip-flop in the pulse period counter.

Referring next to Fig. 5, a detailed schematic circuit diagram is shown of how the F1 flip-flop is connected so as to operate as the first stage of the pulse period counter.

The flip-flop circuit as used in the present invention is well known in that it is comprised of two triodes, $V_1$ and $V_2$, having the plate of each intercoupled to the grid of the other by a resistor R in parallel with a capacitor C. The plate of each of the triodes is connected through a separate load resistor, like resistor $R_1$, to a positive D. C. source B+, and the cathode of each triode is grounded. Each of the grids of the tubes is joined through a separate grid resistor $R_2$ to a negative bias −E. The flip-flop circuit is provided with triggering circuits associated with each of its grids and output circuits connected to each of its plates.

Whenever the flip-flop is considered to be in a "one" state, neon light L, connected in series with a limiting resistor $R_0$ across the left load resistor $R_1$, lights up; and when the flip-flop is in a "zero" state, neon light L is extinguished.

The output lines $F_1$ and $F_1'$ of the F1 flip-flop circuit are taken from the right and left plates, respectively. In order to maintain the swing of the plate voltage between voltage levels $E_h$ and $E_l$, clamping diodes, such as diodes 20 and 21 associated with the right output $F_1$, are provided on each of the output lines.

The inputs to the flip-flop are controlled by gate circuits 22 and 23 associated with the grids of tubes $V_1$ and $V_2$, respectively. Each of the gate circuits 22 and 23 is coupled through a differentiating circuit 24 and blocking diode 25 to the grid of one of the tubes, as shown in particular for the left grid, the grid of tube $V_1$.

For this particular counting stage, the right plate output $F_1$ is connected to one input of the left gate 22, and the left plate output $F_1'$ is connected to one input of the right gate circuit 23. The clock pulse C is applied simultaneously to the second inputs of each of the left and right gate circuits 22 and 23.

These gate circuits 22 and 23 are typical logical product diode networks. In such a circuit, as noted in particular for left gate 22, the inputs therein are applied to the cathode-ends of crystal diodes 27 and 28 whose anode-ends are joined to a common line 29 which is connected to the positive source B+ through a load resistor $R_3$.

Any time the plate input to the gate circuit is high in potential, the clock pulse C applied to the other input is, in effect, passed to the output. This pulse is differentiated in differentiating circuit 24 and the positive portion thereof is blocked by diode 25 while the negative portion is passed therethrough and thus triggers the $V_1$ tube off.

Figure 6:
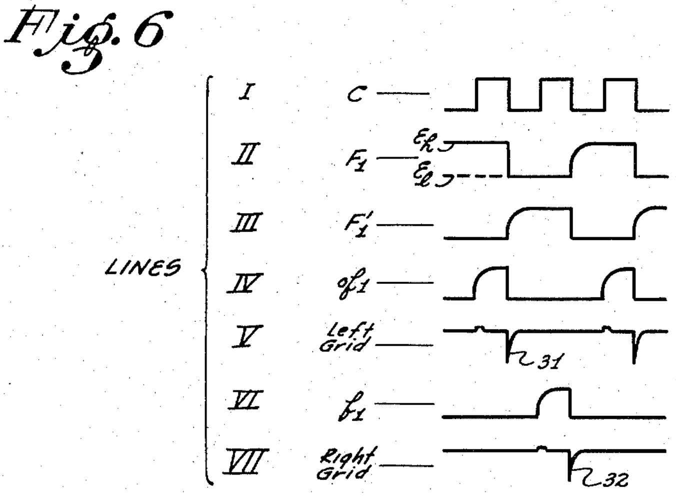
Fig. 6 is a graph of the voltage waveforms which are referred to in explaining the operation of the F1 flip-flop.

In Fig. 6 the graphs of the waveforms appearing at different points of the F1 counting stage circuit, above described, are shown. In line I the regularly recurring clock pulses C are shown; in line II the $F_1$ plate output is shown to be initially of a high voltage ($E_h$); while in line III the $F_1'$ plate output is shown to be initially of a low voltage ($E_l$). As shown in line IV, whenever both the waveforms $F_1$ and C are relatively high in potential, the term ${}_0f_1$ is considered to pass through the gating circuit 22 as a rectangular pulse similar in waveform to the clock pulse C. The clock pulse source is of a low impedance so as to ensure that the trailing edge of the wave is not rounded but relatively square. On line V, the pulse form impressed on the input to the left grid is shown to be essentially the differentiated trailing edge 31 of the rectangular pulse ${}_0f_1$. It is thus noted that the F1 flip-flop changes state on the trailing edge of the ${}_0f_1$ pulse (clock pulse C). It is also noted that as a result of triggering the left tube $V_1$ off, the left plate output $F_1'$ rises in potential according to the time constant of the flip-flop circuit. The output $F_1'$ is now high in potential so that on occurrence of the next clock pulse C, the right gate 23, in effect, allows the clock pulse C to pass therethrough and hence the differentiated trailing edge 32 of this latter pulse triggers the F1 flip-flop back to its original state.

It is now evident that the clock pulse period divides the timing of the circuit operations into two distinct phases. During the first phase of a clock pulse period, when the voltage from the clock source is low, the transients of the circuitry are occurring. For reliability, these transients should be completed before the leading edge of the clock pulse arrives. During the time of the clock pulse the logical network circuits can be thought of as observing the flip-flops and the other sources of inputs so as to determine if a pulse should pass onto the grid of any of the flip-flops. The clock pulse must be broad enough so that, taking into account its rise time, it reaches its maximum voltage level before the end of the clock period. The clock pulse must also have a low impedance source, so that a square edge can be created on the trailing end of the pulse passing through the grid gates. These conditions make it possible to create by differentiation a negative pulse, coincident with the end of the clock period, which can be used for triggering the flip-flops.

Figure 7:
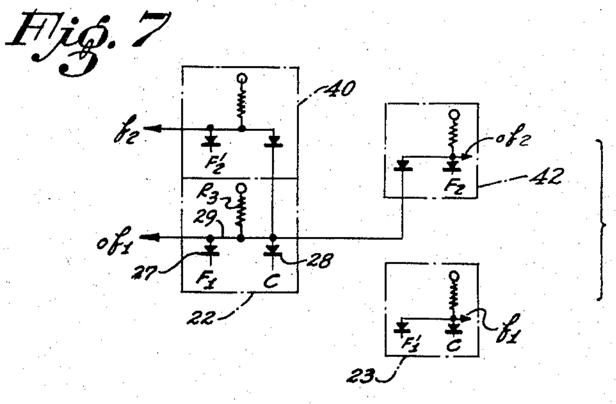
Fig. 7 is a schematic circuit diagram of the counting logical network for the pulse period counter.

Referring next to Figs. 3 and 7, the simplified manner in which the remaining circuitry of the present invention is to be presented will now be described.

Instead of showing the wiring diagrams of the flip-flop circuits together with the logical circuits, as in Fig. 5, the remaining circuits present simplified block diagrams of the flip-flops. It should be understood, however, that all the flip-flop circuits are identical. As shown in Fig. 3, only the input and output lines for the flip-flop are indicated and these are marked in accordance with the convention previously described. Furthermore, the grid input differentiating and blocking circuits are omitted in the block diagrams for simplicity. Only the gates, indicating the logical product of the control input and clock input, are shown at each of the inputs so as to emphasize the fact that the clock pulses are applied simultaneously to all the flip-flop inputs.

In accordance with the scheme of the present invention, after the system of thought to be accomplished is explained by means of binary tables or similar means for systematizing the thought, the terms of the system are represented by the conditions of flip-flop circuits, or other sources of potentials having two possible levels.

Logical equations are then written, which define when and how the flip-flop circuits are to change in accordance with the effective terms of the system, during each clock period of the system cycle. The logical equations, so devised, are presented below the block diagram of the respective flip-flops concerned.

Writing the logical equations for the grid triggering of a flip-flop circuit is no more than stating the terms which have to be simultaneously of a high potential in order that the particular flip-flop should trigger into the particular state. Two distinct notations are used in the equations. The first, "logical multiplication" is defined as meaning that all the terms in the particular product of the equation have to be at the relatively high potential in order to make that product effective in the equation. The second, "logical addition" means that at least one term of the sum has to be at the relatively high potential in order to make that sum effective in a particular equation.

Figure 13:
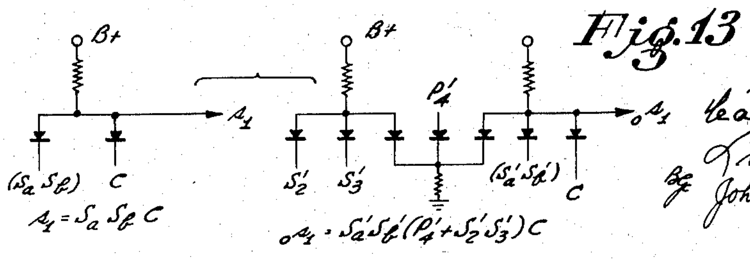
Fig. 13 shows a schematic circuit diagram of the grid input logical networks for the S1 flip-flop.

Thus, for example, the logical equation $$_0s_1=S_a'S_b'(P_4'+S_2'S_3')C$$

which is physically realized by the network shown in Fig. 13, can be interpreted as stating that the S1 flip-flop will be triggered to the "false" state at the end of a clock pulse period during which the following four terms are at a high potential: $S_a'$, $S_b'$, $(P_4'+S_2'S_3')$, and C; where the term $(P_4'+S_2'S_3')$ itself is interpreted as being of a high potential if either $P_4'$ and/or $(S_2'S_3')$ is of a high potential.

The particular representation of these logical equations has been chosen because these equations can be operated upon according to certain well-known rules of Boolean algebra.

Having once described the means for physically generating a typical logical product and logical sum circuit, the present techniques enable the logical circuitry for solving the entire logical system to be set up directly by reference to the equations alone. The logical circuitry generally ends up as one large interconnected network made up of these two fundamental circuits. In reducing the equations to physical circuitry, recognition is made of the fact that certain common complex terms and partial products need only be generated once and used repeatedly in other parts of the networks as required. This results in a simplification of the logical equations, and consequently a reduction of the number of components required in the physical circuitry, but often at the expense of complicating the recognition of the original logical equations. The present techniques, however, make it possible to retain in the equations the original system of thought, even though the equations go through several revisions, as long as the revisions are according to the well-known rules of Boolean algebra.

It should be noted that circuits to solve "logical multiplication" are also called "gates," and circuits to solve "logical addition" are also called "mixers" in the prior art.

Returning back to Fig. 3, the conditions required for flipping the F1 flip-flop, as previously described in connection with Fig. 5, are represented by symbolic logical equations $f_1=F_1'C$ and $_0f_1=F_1C$.

By examining the states of the F flip-flops, as presented in Fig. 4, the symbolic logical equations for the F2 flip-flop can be similarly determined. The conditions necessary to make flip-flop F2 trigger to a true state, i. e., change from a 0 to a 1 state, are that flip-flop F1 be in a true state and flip-flop F2, itself, be in a false state; this can be symbolically noted by $f_2=F_2'F_1C$. In a similar manner, the conditions required to make the flip-flop F2 false are that flip-flop F2 be true and flip-flop F1 be true, i. e., $_0f_2=F_2F_1C$.

The logical diode networks employed for physically solving all the triggering equations for the pulse period counter 14 will next be introduced in Fig. 7.

The networks for physically solving equations $$_0f_1=F_1C \text{ and } f_1=F_1'C$$

associated with the F1 flip-flop are the gate circuits 22 and 23, respectively, as previously shown in Fig. 5. Here they are simply shown by designating the inputs to gate 22, which is a typical two input product gate, by terms of the $_0f_1$ equation, and by designating the inputs to the product gate 23 by terms of the $f_1$ equation. The outputs of these gates are marked, respectively, $_0f_1$ and $f_1$. Each of these product circuits is such that whenever any of the inputs are of relatively low potential, the output is also of relatively low potential; however, when all the inputs are of relatively high potential, the output is also of relatively high potential. In other words, the output potential equals the lowest input potential.

The equation for generating $f_2$ is seen, in Fig. 3, to be a product of the same two terms defining $_0f_1$ multiplied by an additional term $F_2'$. It should be noted in Fig. 7 that instead of providing a three input product circuit for solving the $f_2$ equation, the output of the two input product circuit 22 is cascaded into a second two input product circuit 40 along with the new term $F_2'$. Thus the output $f_2$ of the second two input product circuit 40 generates the $f_2$ solution.

The equation $_0f_2$ also includes the common product defining $_0f_1$. Hence the output of the two input product circuit 22 is also fed as one of the inputs 41 into a third two input product circuit 42 along with the new term $F_2$. The output of this third product circuit 42 provides $_0f_2$.

The above circuits illustrate clearly how the equations defining the inputs to the proposition flip-flops operate as a key, revealing the manner in which the outputs of the flip-flops are logically interconnected to the inputs, i. e., they define how and when the flip-flops should change with respect to the conditions of other propositions in the system.

The equations representing the timing pulses $P_2$, $P_3$, $P_4$, and $P_4'$ define the timing terms as required in the final summer circuits. These timing terms are seen in Fig. 4 to be comprised of logical products of the terms represented by the outputs from the F flip-flops. These products are physically generated by the networks shown in Fig. 12. Here it is shown that $P_2=(F_1F_2)$ is manifested on line 64, $P_3=F_1'F_2'$ on line 65, $P_4=(F_1F_2')$ on line 66, and $P_4'=(F_1'+F_1F_2)$ on line 67.

*Summer circuits*

The summer circuit 10 of Fig. 1 will now be described in detail.

The accumulated sum of the weighted inputs $S_a$ and $S_b$ is stored in the summer flip-flop, in the binary number system, during each clock pulse period; however, as noted by comparing Figs. 8, 9, 10, and 11, each of the summer flip-flops does not represent the same stage or digital position of the binary number system during any two pulse periods of a counting cycle. For example, the S1 flip-flop successively represents stages $2^0$, $2^1$, $2^2$, and $2^3$ during the $P_1$, $P_2$, $P_3$, and $P_4$ pulse periods, respectively. For this reason, the overall action of the summer circuit may best be understood by first explaining the summer action for each of the four pulse periods of a cycle.

The general scheme employed for presenting and describing the action of the summer during each of the pulse periods is as follows:

During each of the pulse periods $P_1$, $P_2$, $P_3$, and $P_4$ of the summer cycle, the inputs $S_a$ and $B_b$ are given the value as defined in Table I or II. In addition, the summer flip-flops S1, S2, and S3 are storing information during each of these pulse periods, as shown in the table to the left of the summer flip-flops in Figs. 8, 9, 10, and 11. With these values assigned to the terms of the logical grid equations presented below the summer flip-flops, trigger signals are derived for triggering the flip-flops at the end of each pulse period in question, so as to store in the summer flip-flops an accumulated count, as indicated by the table associated with the following pulse period. For example, during $P_1$ pulse period, the logical networks for the S1 and S2 flip-flops sense the inputs $S_a$ and $S_b$ into the summer and the contents as found in the S1 flip-flop. At the end of the $P_1$ pulse period, trigger signals are thus obtained for changing the status of the S1 and S2 summer flip-flops so as to set up therein the accumulated sum indicated by Table IV in Fig. 9. In a like manner, during the $P_2$ pulse period, logical networks for the S1, S2 and S3 flip-flops sense the inputs $S_a$ and $S_b$, as well as information in the S1 and S2 flip-flops, so as to set up the S1, S2 and S3 flip-flops, at the end of the $P_2$ pulse period, to represent the accumulated sum as defined by Table V of Fig. 10.

*$P_1$ pulse period*

Figure 8:
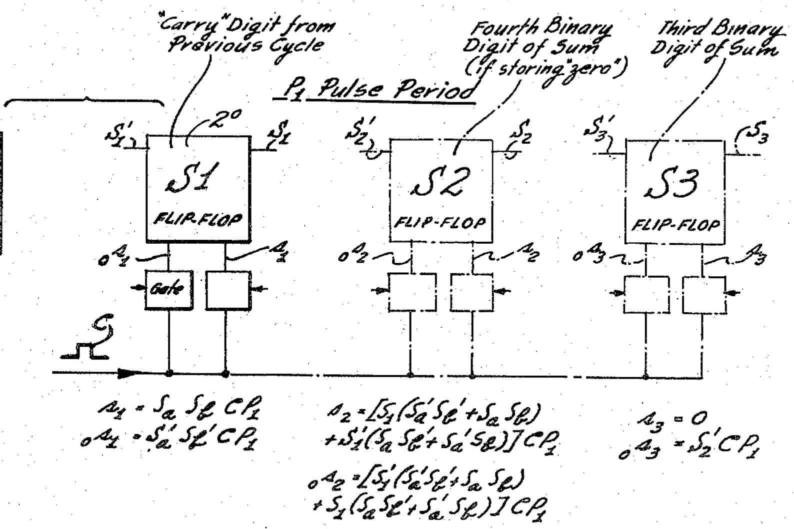
Fig. 8 is a block diagram of the summer flip-flops together with a binary table showing the contents of the summer flip-flops during the first pulse period. Also shown are the symbolic equations defining the grid triggering input networks which are effective during the first pulse period.

In Fig. 8, the block diagrams of the S1, S2, and S3 flip-flops are shown, together with the logical trigger equations associated with each of the grid inputs during the $P_1$ pulse period. As noted, the S1 flip-flop represents stage $2^0$ of a binary counter, whereas the S2 and S3 flip-flops contain information representing the fourth and third binary digits, respectively, of the sum coded decimal digit resulting from the previous summation cycle, and therefore are represented by broken lines. Table III gives the decimal content in the summer, as found in the S1 flip-flop during the $P_1$ pulse period. This content represents either the presence or absence of a decimal "carry" from the previous summation cycle.

During the $P_1$ pulse period, as shown by Table I of Fig. 2, the effective external inputs (high potentials) received on $S_a$ and $S_b$ are each assigned a unit weight. The maximum accumulated decimal count capable of being sensed during the $P_1$ pulse period therefore is 3: an input on both $S_a$ and $S_b$, and a "carry" from the previous summation cycle. This total accumulated count is capable of being set up in binary form in the S1 and S2 flip-flops at the end of the $P_1$ pulse period, and stored therein during the $P_2$ pulse period. Table IV, Fig. 9, shows the states the S1 and S2 flip-flops must assume at the end of the $P_1$ pulse period in order to store the accumulated count sensed during the $P_1$ pulse period.

It should be noted that the S1 flip-flop represents the $2^0$ stage or digital position of the binary counter during the $P_1$ pulse period. However, as a result of sensing the information available during the $P_1$ pulse period, the S1 flip-flop is triggered so as to store information corresponding to the $2^1$ stage of a binary counter during the $P_2$ pulse period, as indicated by Table IV of Fig. 9. From this table it is evident that the S1 flip-flop should be in the "one" state for a partial decimal sum of either 2 or 3. These conditions are (1) a "carry" from the previous summation cycle and a unit input on either $S_a$ or $S_b$, or both; or (2) no "carry" from the previous summation cycle, and a unit input on both $S_a$ and $S_b$. But, as has been previously explained, a "carry" from the previous summation cycle is stored in the S1 flip-flop during the $P_1$ pulse period. If a "carry" exists the S1 flip-flop will already be in the "one" state. Thus the logical grid equation needed for controlling the "one" state of the S1 flip-flop need only satisfy the second of these conditions:

$$s_1 = S_a S_b C P_1$$

Figure 9:
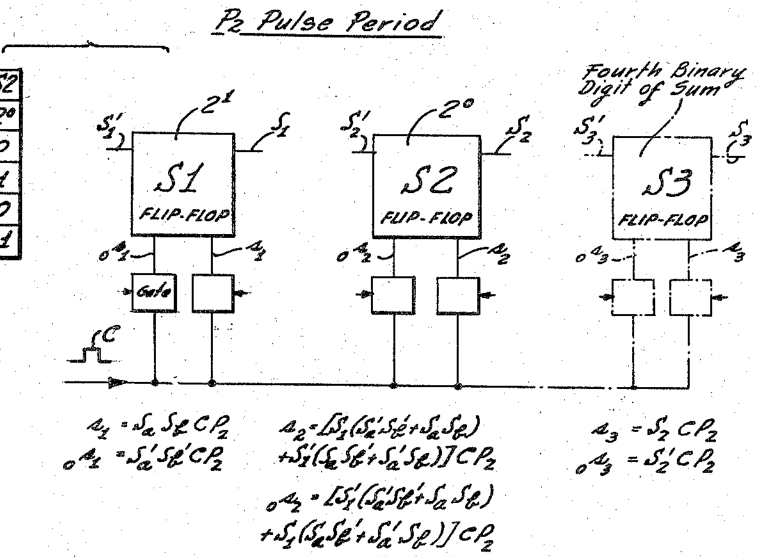
Fig. 9 is a block diagram of the summer flip-flops together with a binary table showing the contents of the summer flip-flops during the second pulse period. Also shown are the symbolic equations defining the grid triggering input networks which are effective during the second pulse period.

Again referring to Table IV of Fig. 9, the S1 flip-flop should be triggered into a "zero" state for accumulated decimal sums of 0 or 1. These conditions are (1) no "carry" and a unit input on either $S_a$ or $S_b$; or (2) a "carry" and no inputs on either $S_a$ or $S_b$. But again, since the "carry" was stored in the S1 flip-flop during the $P_1$ pulse time, if no "carry" existed, the S1 flip-flop will already be in a "zero" state. Thus, here also, the logical equation needed for controlling the "zero" state of the S1 flip-flop need only satisfy the second of these conditions:

$$_0s_1 = S_a' S_b' C P_1$$

The contents of the S2 flip-flop corresponds to the fourth binary digit of the sum coded decimal digit rerived from the previous summer cycle and hence is not used during the summing action of the $P_1$ period. However, the S2 flip-flop is employed for storing the sum of the inputs sensed during the $P_1$ pulse period. Thus, as shown by Table IV in Fig. 9, the S2 flip-flop represents the $2^0$ stage of a binary counter and is in the "zero" state for accumulated decimal counts of 0 and 2, and in the "one" state for accumulated decimal counts of 1 and 3. Considering first the logical grid equations for triggering the S2 flip-flop to the "one" state at the end of the $P_1$ pulse period, all possible conditions which give a partial decimal sum of either 1 or 3 during $P_1$ time must be considered. These conditions are (1) a "carry" from the previous summation cycle and no inputs on either $S_a$ or $S_b$; or (2) a "carry" and a unit input on both $S_a$ and $S_b$; or finally (3) no "carry" existing from the previous summation cycle and a unit input on either $S_a$ or $S_b$, but not both. The logical grid equation satisfying the above conditions is:

$$s_2 = [S_1(S_a' S_b' + S_a S_b) + S_1'(S_a S_b' + S_a' S_b)] C P_1$$

Considering next the logical grid equation for triggering the S2 flip-flop to the "zero" state at the end of the $P_1$ pulse period, all possible conditions which give a partial decimal sum of 0 or 2 must be considered. These conditions are (1) no "carry" from the previous summation cycle and no input on either $S_a$ or $S_b$; or (2) no "carry" and a unit input on both $S_a$ and $S_b$; or finally (3) a "carry" and a unit input on either $S_a$ or $S_b$, but not both. The logical grid equation to satisfy these conditions is:

$$_0s_2 = [S_1'(S_a' S_b' + S_a S_b) + S_1(S_a S_b' + S_a' S_b)] C P_1$$

The S3 flip-flop is storing, during the $P_1$ pulse period, the third binary digit of the sum coded decimal digit resulting from the previous summation cycle, and has the fourth binary digit of the sum code digit shifted therein from the S2 flip-flop at the end of the $P_1$ pulse period. Hence the logical grid equations for the S3 flip-flop will be derived at the beginning of the next summation cycle.

From Table I, Fig. 2, it is seen that the first output potential emitted from the summer during the $P_3$ pulse period will indicate whether the decimal sum digit is an odd or an even number. An output sum of 0, 2, 4, 6, 8, 10, 12, 14, 16, or 18, i. e., all even numbers, will have a "zero" as the first output potential. Similarly, an output sum of 1, 3, 5, 7, 9, 11, 13, 15, 17, and 19 will have a "one" as the first output potential. Noting that the weight of the inputs $S_a$ and $S_b$ after the first pulse period are even values, namely, 2, 4, and 2 for periods $P_2$, $P_3$, and $P_4$, respectively, it is obviously determinable during the $P_2$ pulse period whether the final decimal sum digit will have an odd or an even value (i. e., at the end of the $P_1$ pulse period). The potential representative of the first output binary digit could thus be immediately read out from the S2 flip-flop during $P_2$ time. However, since the remaining output binary digits are not determinable in order, it is necessary to delay the feeding out of this first output binary digit for another clock pulse period.

*$P_2$ pulse period*

Referring next to Fig. 9, the block diagrams of the S1, S2, and S3 flip-flops are shown together with the logical trigger equations associated with each of the grid inputs for the $P_2$ pulse period; and Table IV gives the decimal content of these summer flip-flops during the $P_2$ pulse period. The effective inputs (high potentials) received on $S_a$ and $S_b$ during this time are weighted two (Fig. 2). The maximum accumulative decimal count which may be sensed during this $P_2$ pulse period is 7, a possible decimal value of 3 stored in the summer flip-flops together with a two-unit input on both $S_a$ and $S_b$. This accumulated decimal count as sensed during the $P_2$ pulse period is stored in binary number form in the summer flip-flops during the $P_3$ pulse period according to Table V, Fig. 10. As is well understood, increasing a binary number by a power of 2 does not affect the binary digits representing the lower order stages of the binary number, i. e., increasing a binary number by $2^1$ or 2 units does not affect the binary digit representing the $2^0$ order of the binary number; and increasing a binary number by $2^2$ or 4 units does not affect the binary digit representing either the $2^0$ or $2^1$ stages, etc. By this reasoning, the contents of the S2 flip-flop, which represents $2^0$ stage during the $P_2$ pulse period, cannot possibly change as a result of any inputs received during the $P_2$ pulse period and hence it is merely shifted to the S3 flip-flop at the end of the $P_2$ pulse period. Thus the logical grid equations for the S3 flip-flop during the $P_2$ pulse period become:

$$s_3=S_2CP_2$$

and $$_0s_3=S_2'CP_2$$

Figure 10:
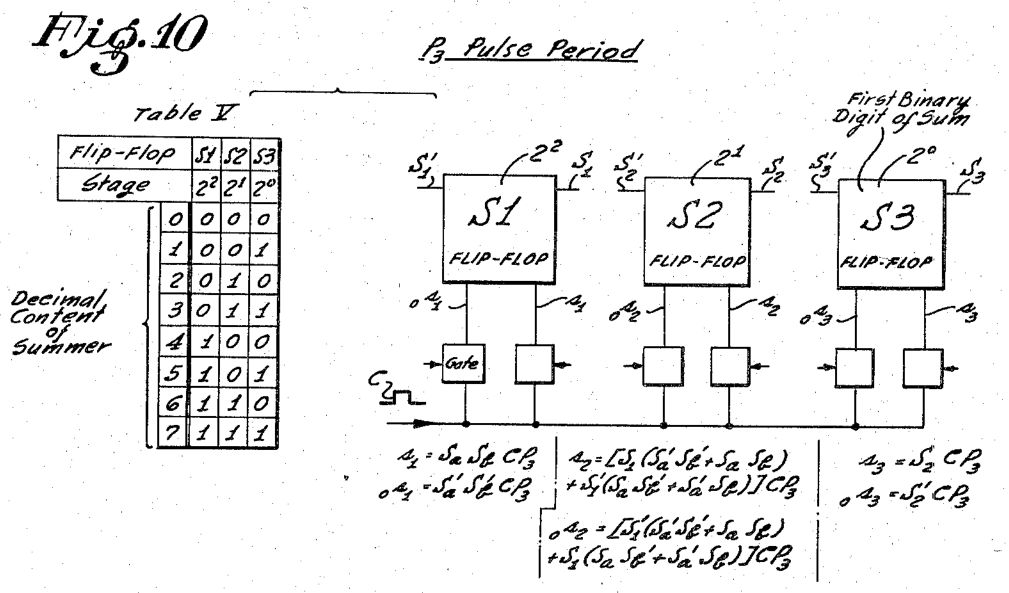
Fig. 10 is a block diagram of the summer flip-flops together with a binary table showing the contents of the summer flip-flops during the third pulse period. Also shown are the symbolic equations defining the grid triggering input networks which are effective during the third pulse period.

The S2 flip-flop, as seen in Table V, Fig. 10, represents the $2^1$ stage or digital position of a binary number during $P_3$ time; the "one" state of this S2 flip-flop representing a partial decimal sum of 2, 3, 6, or 7. The conditions possible to give a partial decimal sum of either 2, 3, 6, or 7 during $P_2$ time are (1) a partial decimal sum of 2 or 3 stored in the summer and no inputs on either $S_a$ or $S_b$; (2) a partial decimal sum of 2 or 3 in the summer and a two-unit input on both $S_a$ and $S_b$; or finally (3) a partial decimal sum of 0 or 1 in the summer and a two-unit input on either $S_a$ or $S_b$, but not both. Examining Table IV, Fig. 9, it may be seen that a partial decimal sum of 0 or 1 during $P_2$ time will be indicated by a "zero" state of the S1 flip-flop; and that a partial decimal sum of 2 or 3 in the summer will be evidenced by a "one" state of the S1 flip-flop. It thus follows that the logical grid equation which satisfies the above possible conditions becomes:

$$s_2=[S_1(S_a'S_b'+S_aS_b)+S_1'(S_aS_b'+S_a'S_b)]CP_2$$

From Table V, Fig. 10, a partial decimal sum of 0, 1, 4, or 5 is indicated by the "zero" state of the S2 flip-flop during $P_3$ time. The possibilities for this are (1) a partial decimal sum of 0 or 1 in the summer during $P_2$ time (Table IV, Fig. 9) and no input on either $S_a$ or $S_b$; or (2) a partial decimal sum of 0 or 1 during $P_2$ time and a two unit input on both $S_a$ and $S_b$; or finally (3) a partial decimal sum of 2 or 3 in the summer during $P_2$ time and one two-unit input on either $S_a$ or $S_b$, but not both. As stated before, a partial decimal sum of 0 or 1 is evidenced in the summer during $P_2$ time by a "zero" state of the S1 flip-flop, and a partial sum of 2 or 3 is evidenced in the summer during $P_2$ time by a "one" state of the S1 flop-flop. Thus the logical grid equation for triggering the S2 flip-flop into a false state at the end of $P_2$ time is:

$$_0s_2=[S_1'(S_a'S_b'+S_aS_b)+S_1(S_aS_b'+S_a'S_b)]CP_2$$

It is evident from Table V, Fig. 10, that the partial decimal sums of 4, 5, 6, and 7 are indicated by a "one" state of the S1 flip-flop during $P_3$ time. The possible conditions to obtain any of these sums are (1) a partial decimal sum of 2 or 3 during $P_2$ time and a two-unit input on either $S_a$ or $S_b$, or both; or (2) a partial decimal sum of 0 or 1 during $P_2$ time and a two-unit input on both $S_a$ and $S_b$. Since a partial decimal sum of 2 or 3 in the summer during $P_2$ time is already evidenced by the "one" state of the S1 flip-flop, the logical grid equation need only be written for the latter condition above, thus:

$$s_1=S_aS_bCP_2$$

Similarly, the logical grid equation for triggering the S1 flip-flop into a "zero" state at the end of the $P_2$ pulse period need only be considered for the condition where a partial decimal sum of 2 or 3 existed in the summer (Table IV, Fig. 9), and no inputs are received during $P_2$ time, thus: $_0s_1=S_a'S_b'CP_2$.

*$P_3$ pulse period*

The action of the summer will now be described for the $P_3$ pulse period. Fig. 10 is a diagram of the summer flip-flops accompanied by the logical grid equations for this period. Table V gives the decimal equivalent of the accumulated sum stored in binary form in the summer during $P_3$ time, and is representative of a conventional binary number system of three stages. The effective external inputs (high potentials) received on $S_a$ and $S_b$ are each given a weight of four units during the $P_3$ pulse period as indicated by Table I, Fig. 2. As is well understood, and as previously explained in detail, increasing a binary number by either four or eight units will not affect the digits of the binary number representing the $2^1$ or $2^2$ stages. Accordingly, the contents of the S2 flip-flop during $P_3$ time, representing the $2^1$ stage or digital position of a binary number form of the summer contents (Table V, Fig. 10) is merely transferred to the S3 flip-flop (Table VI, Fig. 11), representing the same stage of a binary number form of the accumulated summer contents at the end of the $P_3$ pulse period. Thus the S3 flip-flop logical grid equations become:

$$s_2=S_2CP_3$$

and $$_0s_3=S_2'CP_3$$

Figure 11:
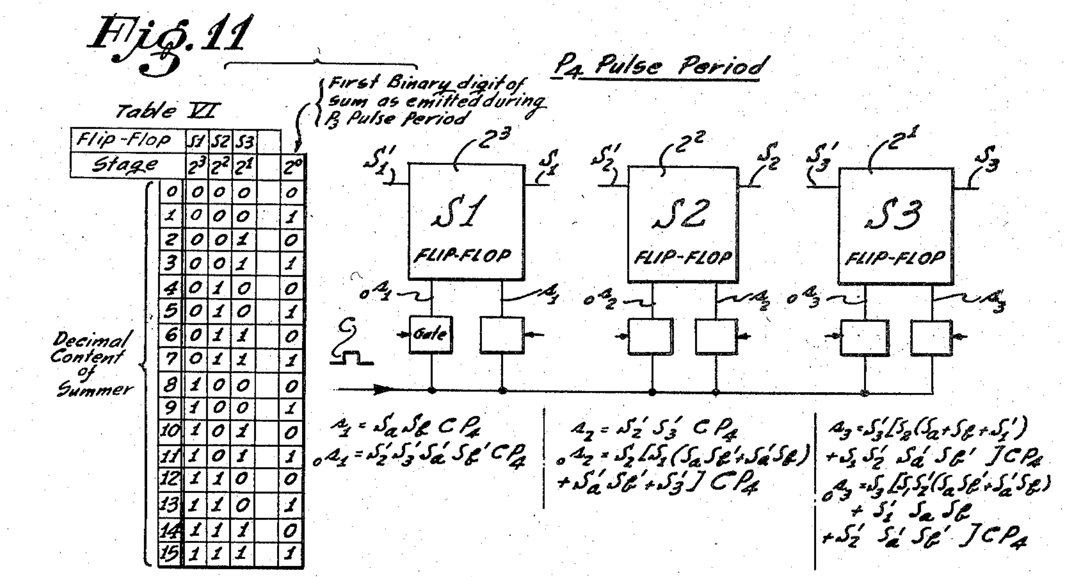
Fig. 11 is a block diagram of the summer flip-flops together with a binary table showing the contents of the summer flip-flops during the fourth pulse period. Also shown are the symbolic equations defining the grid triggering input networks which are effective during the fourth pulse period.

From Table VI, Fig. 11, which represents the summer contents during the $P_4$ pulse period in binary number form, it can be noted that the S2 flip-flop which represents the $2^2$ stage or digit of a binary number ends up in a state opposite that of the S1 flip-flop during the $P_3$ pulse period (Table V, Fig. 10), for a decimal increase of 4, and ends up in the same state as the S1 flip-flop for a decimal increase of 8. Since the inputs $S_a$ and $S_b$ received during the $P_3$ pulse period are each weighted four-units, it may thus be stated that the S2 flip-flop should be in the same state during the $P_4$ pulse period as the S1 flip-flop was during the $P_3$ pulse period, as they both represent the same stage, namely, $2^2$, for their respective periods, if either no inputs are received on either $S_a$ or $S_b$ or if four-unit inputs are received on both $S_a$ and $S_b$ during the $P_3$ pulse period. It may be further stated that the S2 flip-flop during $P_4$ time should be in a state opposite that of the S1 flip-flop during $P_3$ time, if a four-unit input is received on either $S_a$ or $S_b$, but not both. The grid logical equations for the S2 flip-flop during the $P_3$ pulse period are therefore:

$$s_2 = [S_1(S_a'S_b' + S_aS_b) + S_1'(S_aS_b' + S_a'S_b)]CP_3$$

$$_0s_2 = [S_1'(S_a'S_b' + S_aS_b) + S_1(S_aS_b' + S_a'S_b)]CP_3$$

It is noted from Table VI, Fig. 11, that the S1 flip-flop ends up at the end of the $P_2$ pulse period in a "one" state for decimal values of 8 to 15, inclusive, and ends up in a "zero" state for values of 0 to 7, inclusive. Considering first the logical grid equation for rendering the S1 flip-flop into a "one" state during $P_3$ time, the possibilities of a partial decimal sum of 8 to 15, inclusive, at the end of $P_3$ time are (1) a partial decimal sum of 4 to 7, inclusive, in the summer and a four-unit input on either $S_a$ or $S_b$, or both $S_a$ and $S_b$, during $P_3$ time; or (2) a partial decimal sum of 0 to 7, inclusive, in the summer and a four-unit input on both $S_a$ and $S_b$ during $P_3$ time. The S1 flip-flop is already in a "one" state (Table V, Fig. 10) for partial decimal sums of 4 to 7, inslusive; therefore, the equation need be written only for the second possibility, thus:

$$s_1 = S_aS_bCP_3$$

The possibilities for a partial decimal sum of 0 to 7, inclusive, at the end of $P_3$ time are (1) a partial decimal sum of 0 to 3 in the summer during $P_3$ time and a four-unit input on either $S_a$ or $S_b$; or (2) a partial decimal sum of 0 to 7 in the summer and no inputs on either $S_a$ or $S_b$ during $P_3$ time. But the S1 flip-flop is already "zero" (Table V, Fig. 10) for partial decimal sums of 0 to 3, inclusive, during $P_3$ time; and thus it is necessary to write the equation for the second possibility only:

$$_0s_1 = S_a'S_b'CP_3$$

One feature of advantage of the present invention should be pointed out at this time. A comparison of Figs. 8, 9, and 10 indicates that the logical grid equations for the summer flip-flops are identical for the pulse periods $P_1$, $P_2$, and $P_3$, with the slight exception of the $s_3$ equation during the $P_1$ pulse period. For example, the logical grid equation for rendering the S2 flip-flop into a "one" state, namely $$s_2 = [S_1(S_a'S_b' + S_aS_b) + S_1'(S_aS_b' + S_a'S_b)]C$$

is the same for all three of these pulse periods, not taking into account the pulse period term itself. This similarity of the logical grid equations of the flip-flops of the summer is of great advantage in that it permits using the same specified logical network for each grid of the summer flip-flop during three out of four pulse periods. This not only greatly simplifies the logical specifications of the system but also results in a reduction in components required to physically realize the equations over that necessary wherein a separate logical network is specified for each grid for each pulse period.

It should be noted that the first output potential, that is, the first output binary digit, characterizing the total decimal sum as odd or even, is emitted from the summer during the $P_3$ pulse period. This first output binary digit is the digit stored in the S3 flip-flop as a result of the binary count. The logical equation defining how this is accomplished will be explained in the ensuing discussion.

*$P_4$ pulse period*

The logical grid equations for the $P_4$ pulse period will now be considered. It should now be evident that by noting the partial decimal sum stored in the counter and observing the inputs during $P_4$ pulse period, all the information about the incoming coded digits is now available and the binary-coded-decimal sum output digit can be clearly defined. The networks for determining the value of the second, third, and fourth output binary digits may be understood by referring to the coded decimal Table I of Fig. 2. The second output binary digit is fed directly out of the logical network which generates it during the $P_4$ pulse period. The third output binary digit, on the other hand, is stored in the S3 flip-flop at the end of the $P_4$ pulse period, and is emitted from the summer during the following $P_1$ pulse period. Information concerning whether the fourth output binary digit is different from the third binary digit, is stored in the S2 flip-flop at the end of the $P_4$ pulse period. This information is then used to properly set up the S3 flip-flop at the end of the following $P_1$ pulse period, so that the fourth output binary digit can be emitted therefrom during the succeeding $P_2$ pulse period. The "carry" digit, which exists for all total decimal sums from 10 to 19, inclusive, is likewise determined by a logical network during the $P_4$ pulse period and is stored in the S1 flip-flop at the end of the $P_4$ pulse period.

Since the second output binary digit is fed directly out of the summer from the logical network which generates it, this network will not be introduced at this time but, instead, the logical equation for storing the third output binary digit in the S3 flip-flop will next be described. It should be noted that, although the output binary-coded-decimal digit is always represented by the code in Table I of Fig. 2, the input to the summer may be represented by either the code in Table I or the code in Table II of Fig. 2. As is well understood, in carrying out subtraction by means of digital computers, the subtrahend may be inverted to give the nine's complement, and added to the minuend. As previously stated, Table II of Fig. 2 is obtained by inverting the waveform of a number to obtain a code of the nine's complement as desired for subtraction.

As previously stated, the third output binary digit is read from the S3 flip-flop during the succeeding $P_1$ pulse period. From Table I, Fig. 2, the S3 flip-flop should be in the "one" state during the following $P_1$ pulse period for the total decimal sums of 4, 5, 6, 7, 8, 9, 14, 15, 16, 17, 18, and 19. Since, irrespective of whether the sum is 4 or 5, 6 or 7, etc., the S3 flip-flop assumes the same state, only the even values 4, 6, 8, 14, 16, and 18 need be considered at this time. During $P_4$ time there are three input conditions to be considered: (1) No input on either $S_a$ or $S_b$, (2) a two-unit input on either $S_a$ or $S_b$, but not both; or (3) a two-unit input on both $S_a$ and $S_b$.

Considering the first input condition characterized by no inputs being received during $P_4$ time, the S3 flip-flop should be triggered to the "one" state at the end of $P_4$ time for partial decimal sums of 4, 6, 8, or 14 in the summer during the $P_4$ pulse period. But from Table VI, Fig. 11, the S3 flip-flop is already in the "one" state for partial decimal counts of 6 and 14, which leaves only the summer contents of 4 and 8 to be considered: Thus:

| *Partial decimal sum* | | *Input (total weight)* | *Logical equation* |
|---|---|---|---|
| 4 | + | 0 | $=S_1'S_2S_3'S_a'S_b'$ |
| 8 | + | 0 | $=S_1S_2'S_3'S_a'S_b'$ |

For the second input condition characterized by a two-unit input being received on one of the inputs, $S_a$ or $S_b$, the S3 flip-flop should be triggered to the "one" state for partial decimal sums of 2, 4, 6, 12, or 14. By noting Table VI, Fig. 11, it may be observed that the partial sums of 2, 6, and 14 are eliminated, inasmuch as the S3 flip-flop is already in the "one" state for these partial sums, leaving the partial sums of 4 and 12 to be considered. Thus:

| Partial decimal sum | | Input (total weight) | Logical equation |
|---|---|---|---|
| 4 | + | 2 | $=S_1'S_2S_3'(S_aS_b'+S_a'S_b)$ |
| 12 | + | 2 | $=S_1S_2S_3'(S_aS_b'+S_a'S_b)$ |

For the third input condition characterized by a two-unit input being received on both inputs, $S_a$ and $S_b$, the S3 flip-flop should be triggered to the "one" state for partial decimal sums of 0, 2, 4, 10, 12, or 14. But from Table VI, Fig. 11, it is seen that the S3 flip-flop is already in the "one" state for partial sums of 2, 10, and 14, which leaves only partial sums of 0, 4, and 12 to be considered. A further simplification can be observed by a study of Tables I and II, Fig. 2. When both $S_a$ and $S_b$ have two-unit inputs thereon during the $P_4$ pulse period, at least one of the decimal input digits to the summer must be an 8 or 9, and the other decimal input digit to the summer may be the nine's complement, as expressed in Table II, Fig. 2, representing the subtrahend in subtraction as previously explained. This means then that a partial decimal sum of at least 6 must exist in the summer when both $S_a$ and $S_b$ have two-unit inputs thereon during the $P_4$ pulse period. This eliminates the partial sums of 0 and 4 as impossible. Thus, only the partial sum of 12 need be provided for. In order to simplify the logical network equations, however, sometimes a term is introduced which represents a condition impossible to actually attain in the system. This is permissible in that, since the condition represented by the term never actually happens, the added term cannot affect the results. Thus the partal sum of 4 will be included in the conditions being considered at this time. Thus:

| Partial decimal sum | | Input (total weight) | Logical equation |
|---|---|---|---|
| 4 | + | 4 | $=S_1'S_2S_3'S_aS_b$ |
| 12 | + | 4 | $=S_1S_2S_3'S_aS_b$ |

Recapitulating all the above conditions wherein the S3 flip-flop is triggered to the "one" state, the following tabulation is obtained:

| Partial decimal sum | | Input (total weight) | Logical equation |
|---|---|---|---|
| 4 | + | 0 | $=S_1'S_2S_3'S_a'S_b'$ |
| 4 | + | 2 | $=S_1'S_2S_3'(S_aS_b'+S_a'S_b)$ |
| 4 | + | 4 | $=S_1'S_2S_3'S_aS_b$ |
| 8 | + | 0 | $=S_1S_2'S_3'S_a'S_b'$ |
| 12 | + | 2 | $=S_1S_2S_3'(S_aS_b'+S_a'S_b)$ |
| 12 | + | 4 | $=S_1S_2S_3'S_aS_b$ |

From the above, it is apparent that for a partial decimal sum in the counter of 4, the S3 flip-flop should be made "one" irrespective of whether there are no inputs, a single two-unit input, or two two-unit inputs received during the $P_4$ pulse period. The logical grid equation expressing this characteristic may be written:

$$s_3=S_1'S_2S_3'CP_4 \quad (1)$$

It is further noted that for a partial decimal sum of either 4 or 12, the S3 flip-flop should be triggered to the "one" state for either a single two-unit input or for two two-unit inputs received during the $P_4$ pulse period. Thus:

$$s_3=S_2S_3'(S_a+S_b)CP_4 \quad (2)$$

This leaves only the partial decimal sum of 8 and no inputs to be provided for. Thus:

$$s_3=S_1S_2'S_3'S_a'S_b'CP_4 \quad (3)$$

Combining Equations (1), (2), and (3), the logical grid equation for rendering the S3 flip-flop into a "one" state at the end of the $P_4$ pulse period is:

$$s_3=S_3'[S_1'S_2+S_2(S_a+S_b)+S_1S_2'S_a'S_b']CP_4$$

or by rearrangement of terms:

$$s_3=S_3'[S_2(S_a+S_b+S_1')+S_1S_2'S_a'S_b']CP_4$$

From Table I, Fig. 2, it is seen that the S3 flip-flop should be in the "zero" state during the following $P_1$ pulse period for total decimal sums of 0, 1, 2, 3, 10, 11, 12, and 13. Again, since the S3 flip-flop is in the same state for total decimal sums of 0 and 1, 2 and 3, etc., only the even values 0, 2, 10, and 12 need be considered.

Considering first the condition where no inputs are received during the $P_4$ pulse period, by examining Table VI, Fig. 11, it is seen that the S3 flip-flop is already in the "zero" state for partial sums of 0 and 12, leaving only partial sums of 2 and 10 to consider. A further study of Table VI, Fig. 11, will show that insofar as even partial decimal sums are concerned, the partial sums of 2 and 10 are unique for the condition where the S2 flip-flop is "zero" and the S3 flip-flop is "one." Thus:

| Partial decimal sum | | Input (total weight) | Logical equation |
|---|---|---|---|
| 2 or 10 | + | 0 | $=S_2'S_3S_a'S_b'$ |

Where a two-unit input is received on either $S_a$ or $S_b$, but not both, during the $P_4$ pulse period, the partial sums of 0 and 10 must be considered. But again, from Table VI, for a partial sum of 0, the S3 flip-flop is already in the "zero" state, leaving only the partial sum of 10 to be considered:

| Partial decimal sum | | Input (total weight) | Logical equation |
|---|---|---|---|
| 10 | + | 2 | $=S_1S_2'S_3(S_aS_b'+S_a'S_b)$ |

Where a two-unit input is received on both $S_a$ and $S_b$ during the $P_4$ pulse period, the partial sums of 6 and 8 must be considered. But from Table V, a partial sum of 8 is represented by the "zero" state of the S3 flip-flop, leaving only the partial sum of 6 to be considered. However, as has been previously pointed out, with a two-unit input on both $S_a$ and $S_b$ during $P_4$ pulse period, the partial sum stored in the summer at the end of the $P_3$ pulse period must be 6 or greater. Examining Table VI, Fig. 11, it is evident that for all even values greater than 6, the S1 flip-flop is never in the "zero" state. The condition where a two-unit input is received on both $S_a$ and $S_b$ during the $P_4$ pulse period can thus be written:

| Partial decimal sum | | Input (total weight) | Logical equation |
|---|---|---|---|
| 6 | + | 4 | $=S_1'S_3S_aS_b$ |

Combining the above expressions, the logical grid equation for rendering the S3 flip-flop into a "zero" state at the end of the $P_4$ pulse period becomes:

$${}_0s_3=S_3[S_1S_2'(S_aS_b'+S_a'S_b)+S_1'S_aS_b+S_2'S_a'S_b']CP_4$$

The fourth output binary digit of the total decimal sum is also read from the S3 flip-flop, but during the succeeding $P_2$ pulse time. From Table I, Fig. 2, it is seen that the only time the third and fourth binary digits of the even decimal sums differ are for decimal sums of 4, 6, 14, and 16 (the sums of 14 and 16 are represented in the table by a 4 and 6, respectively, with a "carry" digit as previously explained).

Accordingly, it can be stated that the S3 flip-flop must change from a "one" to a "zero" state at the end of the $P_1$ pulse period for these decimal sums. The scheme employed is to trigger the S2 flip-flop into a "zero" state at the end of the $P_4$ pulse period when the total decimal sum is 4, 6, 14, or 16. The S3 flip-flop is then triggered into a "zero" state at the end of the $P_1$ pulse period of the following summer cycle only if the S2 flip-flop is in a "zero" state during this $P_1$ pulse period. By similar reasoning, and a further examination of Table I, Fig. 2, the S2 flip-flop must be made "one" at the end of the $P_4$ pulse period for total decimal sums of 8 or 18 so as to ensure that the S3 flip-flop is not triggered into a "zero" state at the end of the $P_1$ pulse period. It should be noted that it is immaterial as to whether the S2 flip-flop is triggered into a "one" or "zero" state for the total decimal sums of 0, 2, 10, or 12.

Taking the above information into account, the "one" logical grid equation for the S2 flip-flop during the $P_4$ pulse period will first be determined. Those conditions wherein the S2 flip-flop must be made "one" are:

| *Partial decimal sum* | | *Input (total weight)* | *Logical equation* |
|---|---|---|---|
| 8 | + | 0 | $=S_1S_2'S_3'S_a'S_b'$ |
| 6 | + | 2 | $=S_1'S_2S_3(S_aS_b'+S_a'S_b)$ |
| 14 | + | 4 | $=S_1S_2S_3S_aS_b$ |

Eliminating the last two conditions above, since the S2 flip-flop is already "one" for a partial sum of 6 and 14, and adding in the total decimal sums of 0, 2, 10, or 12, since it is immaterial for these sums whether the S2 flip-flop is triggered into a "one" state, the following tabulation is obtained:

| *Partial decimal sum* | | *Input (total weight)* | *Logical equation* |
|---|---|---|---|
| 0 | + | 0 | $=S_1'S_2'S_3'S_a'S_b'$ |
| 0 | + | 2 | $=S_1'S_2'S_3'(S_a'S_b+S_aS_b')$ |
| 8 | + | 0 | $=S_1S_2'S_3'S_a'S_b'$ |
| 8 | + | 2 | $=S_1S_2'S_3'(S_aS_b'+S_a'S_b)$ |
| 8 | + | 4 | $=S_1S_2'S_3'S_aS_b$ |

An examination of the above conditions indicates that for a partial decimal sum of either 0 or 8, the S2 flip-flop is triggered into a "one" status irrespective of the inputs (the condition of a partial sum of 0 and two two-unit inputs need not be considered because, as previously explained, a partial sum of less than 6 is impossible under these conditions during the $P_4$ pulse period). From Table VI, Fig. 11, it is evident that the partial sums of 0 and 8 are uniquely characterized by both the S2 and S3 flip-flops being in a "zero" state. Accordingly, the "one" logical grid equation for the S2 flip-flop at the end of the $P_4$ pulse period becomes:

$$s_2=S_2'S_3'CP_4$$

The "zero" logical grid equation for the S2 flip-flop at the end of $P_4$ time will now be determined. As previously stated, the S2 flip-flop must be made "zero" for total decimal sums of 4, 6, 14, or 16. These conditions may be tabulated as follows:

| *Partial decimal sum* | | *Input (total weight)* | *Logical equation* |
|---|---|---|---|
| 4 | + | 0 | $=S_1'S_2S_3'S_a'S_b'$ |
| 2 | + | 2 | $=S_1'S_2'S_3(S_aS_b'+S_a'S_b)$ |
| 6 | + | 0 | $=S_1'S_2S_3S_a'S_b'$ |
| 4 | + | 2 | $=S_1'S_2S_3'(S_aS_b'+S_a'S_b)$ |
| 14 | + | 0 | $=S_1S_2S_3S_a'S_b'$ |
| 12 | + | 2 | $=S_1S_2S_3'(S_aS_b'+S_a'S_b)$ |
| 10 | + | 4 | $=S_1S_2'S_3S_aS_b$ |
| 14 | + | 2 | $=S_1S_2S_3(S_aS_b'+S_a'S_b)$ |
| 12 | + | 4 | $=S_1S_2'S_3S_aS_b$ |

By examining the above, it becomes apparent that for partial decimal sums of either 4 or 12, the S2 flip-flop will be made "zero" irrespective of the weight of the inputs. This results from the fact that a partial sum of less than 6 cannot exist with two-unit inputs on both $S_a$ and $S_b$ during the $P_4$ pulse period, and the fact that it is immaterial as to whether the S2 flip-flop is triggered into the "zero" state for a total decimal sum of 12. From Table VI, Fig. 11, it is evident that the partial sums of 4 and 12 are uniquely characterized by the S2 flip-flop being in a "one" state and the S3 flip-flop being in a "zero" state; consequently the grid equation satisfying these conditions becomes:

(4) $${}_0s_2=S_2S_3'CP_4$$

It is noted from the above that with no inputs received on either $S_a$ or $S_b$ during the $P_4$ pulse period, the S2 flip-flop is made "zero" for partial sums of 4, 6, and 14. From Table VI, Fig. 11, it is seen that a "one" state of the S2 flip-flop represents paritial decimal sums of 4, 6, 12, and 14. Since, as previously stated, it is immaterial which state the S2 flip-flop is in for a total decimal sum of 12, the logical grid equation satisfying these conditions is:

(5) $${}_0s_2=S_2S_a'S_b'CP_4$$

Comparing conditions in the above tabulation for partial decimal sums of either 12 or 14, it is apparent that the S2 flip-flop will be made "zero" for a two-unit input on either $S_a$ or $S_b$ during the $P_4$ pulse period. From table V, Fig. 10, it is seen that partial sums of 12 and 14 are uniquely characterized by a "one" state of both S1 and S2 flip-flops. Thus these conditions are satisfied by the equation:

(6) $${}_0s_2=S_1S_2(S_aS_b'+S_a'S_b)CP_4$$

The partial sums of 2 or 10 may be eliminated because the S2 flip-flop is already in the "zero" state for these conditions.

Combining the above equations (4), (5), and (6) for rendering the S2 flip-flop into a "zero" state at the end of the $P_4$ pulse period, the final equation becomes:

$${}_0s_2=S_2[S_1(S_aS_b'+S_a'S_b)+S_a'S_b'+S_3']CP_4$$

The "one" logical grid equation for the S1 flip-flop at the end of the $P_4$ pulse period may next be considered. As previously mentioned, the "carry," which exists for all decimal sums from 10 to 19, inclusive, will be stored in the S1 flip-flop during the following $P_1$ pulse period. Considering only even numbers, from Table VI, Fig. 11, the maximum even partial decimal sum during the $P_4$ pulse period is the decimal 14. Considering all the possibilities for a "carry" (where the total decimal sum is between 10 to 18, inclusive), we have the following: (1) a partial decimal sum of 10 to 14, inclusive, and no inputs on either $S_a$ or $S_b$; (2) a partial sum of 8 to 14, inclusive, and a two-unit input on either $S_a$ or $S_b$, but not both; or (3) a partial sum of 6 to 14, inclusive, and a two-unit input on both $S_a$ and $S_b$. An examination of Table VI, Fig. 11, indicates that for all partial sums of 8 or greater, the S1 flip-flop is already in the "one" state; therefore, no logical grid equations need be written for the first two possibilities above, leaving only the third possibility to be considered. But as previously shown, any time both $S_a$ and $S_b$ have a two-unit input during $P_4$ pulse period the partial sum must always be 6 or greater, the third condition is satisfied whenever there are two-unit inputs on both $S_a$ and $S_b$ during the $P_4$ pulse period. Thus the logical grid equation for triggering the S1 flip-flop into a "one" state becomes:

$$s_1=S_aS_bCP_4$$

The logical grid equation for triggering the S1 flip-flop to the "zero" state at the end of the $P_4$ period will now be considered. The possible conditions to give a total decimal sum of less than 10, i. e., where a decimal "carry" is not wanted, are: (1) no inputs and a partial decimal sum of less than 10; (2) a two-unit input on either $S_a$ or $S_b$, but not both, and a partial decimal sum of less than 8; or (3) a two-unit input on both $S_a$ and $S_b$, and a partial decimal sum of less than 6. But from Table VI, Fig. 11, it is seen that the S1 flip-flop is already "zero" for partial decimal sums of less than 8, which eliminates the necessity of making provisions for the last two conditions above. This leaves only the condition of a partial sum of 8 and no inputs during the $P_4$ pulse period to be provided for. Thus:

$${}_0s_1=S_2'S_3'S_a'S_b'CP_4$$

During the succeeding $P_1$ pulse period, the third output binary digit is read from the S3 flip-flop, while during the $P_2$ pulse period, the fourth output potential is read from the S3 flip-flop. As previously explained in detail, the S3 flip-flop is changed from "one" to "zero" at the end of the $P_1$ pulse period when the total decimal sum is such that the third and fourth output binary digits are not the same (Table I, Fig. 2), but under no conditions is it necessary to provide for the change from "zero" to "one" at the end of the $P_1$ pulse period. The logical equations have also been presented in detail for triggering the S2 flip-flop at the end of the preceding $P_4$ pulse period so as to enable the fourth output binary digit to be stored in the S3 flip-flop at the end of the $P_1$ pulse period. The grid equations for setting the S3 flip-flop at the end of the $P_1$ pulse period (Fig. 8) are therefore: $s_3=0$ and ${}_0s_3=S_2'CP_1$.

The S2 flip-flop again becomes a binary counter stage after the $P_1$ pulse period during which the third output binary digit is emitted from the summer; and similarly, the S3 flip-flop again becomes a counter stage after the $P_2$ pulse period during which the fourth output binary digit is emitted from the summer.

*Summer output*

The logical equations for defining the output from the summer in accordance with the coded decimal representation of Table I, Fig. 2, will now be described. As was previously noted, the corresponding weighted binary digits in the output of the summer are delayed by two pulse periods with respect to the input. As shown in Fig. 1, the first output binary digit is emitted from the summer during the $P_3$ pulse period. Thus the decimal block of the output is evidenced during $P_3$, $P_4$, $P_1$, and $P_2$ pulse periods for the components 1, 2, 4, and 2, respectively.

Because of the particular way in which the output representing the sum is used in computation, it is often desirable to generate a waveform representing the logical inverse of the true sum waveform. The reason for this is so that the output waveform generated can be fed into an amplifier before applying it onto a memory such as a rotating magnetic drum, for example. The amplifying device inverts the signal applied thereto, thus giving the desired waveform at its output.

For this reason, the symbolic equation for the logical inverse of the binary coded output waveform is here presented; but it is to be realized that this choice is arbitrary in that, if desired, the sum waveform could be obtained directly.

As has been previously explained, the first, third, and fourth output potentials, i. e., binary digits, are read from the S3 flip-flop during the $P_3$, $P_1$, and $P_2$ pulse times, respectively. Since it is the logical inverse of the sum which is desired, it is the observance of the "zero" output of the S3 flip-flop which determines the nature of the output logical equations. Hence the logical equation which represents the first, third, and fourth components, i. e., binary digits of the output block, as observed during $P_3$, $P_1$, and $P_2$ pulse times, respectively, is:

$$S_0'=S_3'P_4'$$

During the $P_4$ pulse period, the second output potential, i. e., binary digit, is emitted from the summer. Referring to Table I, Fig. 2, there will be a low potential for total decimal sums of 0, 1, 4, 5, 10, 11, 14, and 15. But since the first output potential determines whether the decimal sum is odd or even, only the even decimal sums need be considered, i. e., 0, 4, 10, and 14. Tabulating all the possible conditions for decimal sums of these values, the following is obtained:

| *Partial decimal sum* | | *Input (total weight)* | *Logical equation* |
|---|---|---|---|
| 0 | + | 0 | $=S_1'S_2'S_3'S_a'S_b'$ |
| 4 | + | 0 | $=S_1'S_2S_3'S_a'S_b'$ |
| 2 | + | 2 | $=S_1'S_2'S_3(S_aS_b'+S_a'S_b)$ |
| 10 | + | 0 | $=S_1S_2'S_3S_a'S_b'$ |
| 8 | + | 2 | $=S_1S_2'S_3'(S_aS_b'+S_a'S_b)$ |
| 6 | + | 4 | $=S_1'S_2S_3S_aS_b$ |
| 14 | + | 0 | $=S_1S_2S_3S_a'S_b'$ |
| 12 | + | 2 | $=S_1S_2S_3'(S_aS_b'+S_a'S_b)$ |
| 10 | + | 4 | $=S_1S_2'S_3S_aS_b$ |

From the above, it is evident that the second output component will be at a low potential when there are no inputs during the $P_4$ pulse period and a partial decimal sum of 0, 4, 10, or 14 in the summer. The logical equation representing these conditions is:

$$S_0'=S_a'S_b'(S_1'S_3'+S_1S_3)P_4$$

It is further noted that for a partial decimal sum of 8 or 12 in the counter and one two-unit input during the $P_4$ pulse period, the second output potential should be "zero". An examination of Table VI, Fig. 11, indicates that partial decimal sums of 8 and 12 are uniquely characterized by the "one" state of the S1 flip-flop and the "zero" state of the S3 flip-flop. Thus the logical equation representing these conditions is:

$$S_0'=S_1S_3'(S_aS_b'+S_a'S_b)P_4$$

As previously noted, with two two-unit inputs during the $P_4$ pulse period, the partial decimal sum must be 6 or greater. A partial decimal of 6 or less (Table VI, Fig. 11) is characterized by the S1 flip-flop being in a "zero" state. Therefore, the equation to satisfy this condition is:

$$S_0'=S_1'S_aS_bP_4$$

The conditions characterized by partial sums of 2 with a two unit input and 10 with two two-unit inputs are irreducible and therefore are written out in their entirety, thus:

$$S_0'=[S_1S_2'S_3(S_aS_b'+S_a'S_b)+S_1S_2'S_3S_aS_b]P_4$$

Collecting all the above expressions into one equation for the four components of the output block, the final equation becomes:

$$S_0'=S_3'P_4'+[S_aS_b(S_1'+S_1S_2'S_3)+(S_aS_b'+S_a'S_b)(S_1S_3'+S_1'S_2'S_3)+S_a'S_b'(S_1'S_3'+S_1S_3)]P_4$$

Since the first part of the expression above, i. e., $S_0'=S_3'P_4'$ includes all cases except the $P_4$ pulse period, any of the later expressions which include both $S_3'$ and $P_4$ may be simplified by elimination of the restricting $P_4$ term, as thereby all time periods are included. The simplified expression becomes:

$$S_0'=S_3'P_4'+S_1S_3'(S_aS_b'+S_a'S_b)+S_1'S_3'S_a'S_b'+[(S_1'+S_1S_2'S_3)S_aS_b+S_1'S_2'S_3(S_aS_b'+S_a'S_b)+S_1S_3S_a'S_b']P_4$$

Before presenting the physical circuits for generating the logical equations needed for the grid inputs to the S counter flip-flops, the derivation of a single equation for the grid input to each of the flip-flops is desirable. That is, instead of having four triggering equations, as shown in Figs. 8 to 11, inclusive, for each of the timing pulses $P_1$, $P_2$, $P_3$, and $P_4$, respectively, a single equation for all four timing periods for each grid may be written. The present scheme particularly leads itself to this simplification, as previously illustrated, because of the similarity of the grid equations for the $P_1$, $P_2$, and $P_3$ pulse periods.

Combining the logical grid equations for the S1 flip-flop for all four pulse periods from Figs. 8, 9, 10, and 11, the combined grid equations become:

$$s_1=S_aS_bC$$
$${}_0s_1=(P_4'+S_2'S_3'P_4)S_a'S_b'C$$

However, in the ${}_0s_1$ expression above, the $P_4$ expression may be eliminated as the conditions, where the S2 and S3 flip-flops are "zero", are included in the $P_4'$ pulse periods, and need not be limited to the $P_4$ pulse period. The final combined grid equations for the S1 flip-flop then become:

$$s_1=S_aS_bC$$
$${}_0s_1=(P_4'+S_2'S_3')S_a'S_b'C$$

In a similar manner, the overall logical grid equations for the S2 flip-flop become:

$$s_2=\{[S_1(S_a'S_b'+S_aS_b)+S_1'(S_aS_b'+S_a'S_b)]P_4'+S_2'S_3'P_4\}C$$
$${}_0s_2=\{[S_1'(S_a'S_b'+S_aS_b)+S_1(S_aS_b'+S_a'S_b)]P_4'+S_2[S_1(S_aS_b'+S_a'S_b)+S_a'S_b'+S_3']P_4\}C$$

Since the condition of the S2 flip-flop is not included in either of the above expressions for the $P_4'$ pulse periods, it is a condition not necessary to, but nevertheless one which may be included in, the expression for the $P_4'$ pulse period. For instance, including the expression $S_2'$ in that portion of the first equation covered by the $P_4'$ period, states in essence that if all the other conditions, as expressed, exist during the $P_4'$ pulse period, then the S2 flip-flop should change to the "one" state if it is in the "zero" state, but if all the other required conditions exist during the $P_4'$ pulse period, then the S2 flip-flop is not changed to the "one" state if it is already in the "one" state. A rewriting of the equation in this manner is seen to affect no change upon the actual results and is herein done to simplify the physical circuitry of the logical grid network. The overall logical grid equations for the S2 flip-flop may be rewritten as follows:

$$s_2=S_2'\{[S_1(S_a'S_b'+S_aS_b)+S_1'(S_aS_b'+S_a'S_b)]P_4'+S_3'P_4\}C$$

$$_0s_2=S_2[S_1'(S_a'S_b'+S_aS_b)P_4'+S_1(S_aS_b+S_a'S_b)+(S_a'S_b'+S_3')P_4]C$$

The equations for the S3 flip-flop may be collected to obtain the following:

$$s_3=\{S_2(P_2+P_3)+S_3'[S_2(S_a+S_b+S_1')+S_1S_2'S_a'S_b']P_4\}C$$

$$_0s_3=\{S_2'P_4'+S_3[S_1S_2'(S_aS_b'+S_a'S_b)+S_1'S_aS_b+S_2'S_a'S_b']P_4\}C$$

By the same reasoning used above, as applied in simplifying the S2 flip-flop equations, the S3 flip-flop equations may be rewritten as follows:

$$s_3=S_3'\{S_2(P_2+P_3)+[S_2(S_a+S_b+S_1')+S_1S_2'S_a'S_b']P_4\}C$$

$$_0s_3=S_3\{S_2'P_4'+[S_1S_2'(S_aS_b'+S_a'S_b)+S_1'S_aS_b+S_2'S_a'S_b']P_4\}C$$

Figure 14:
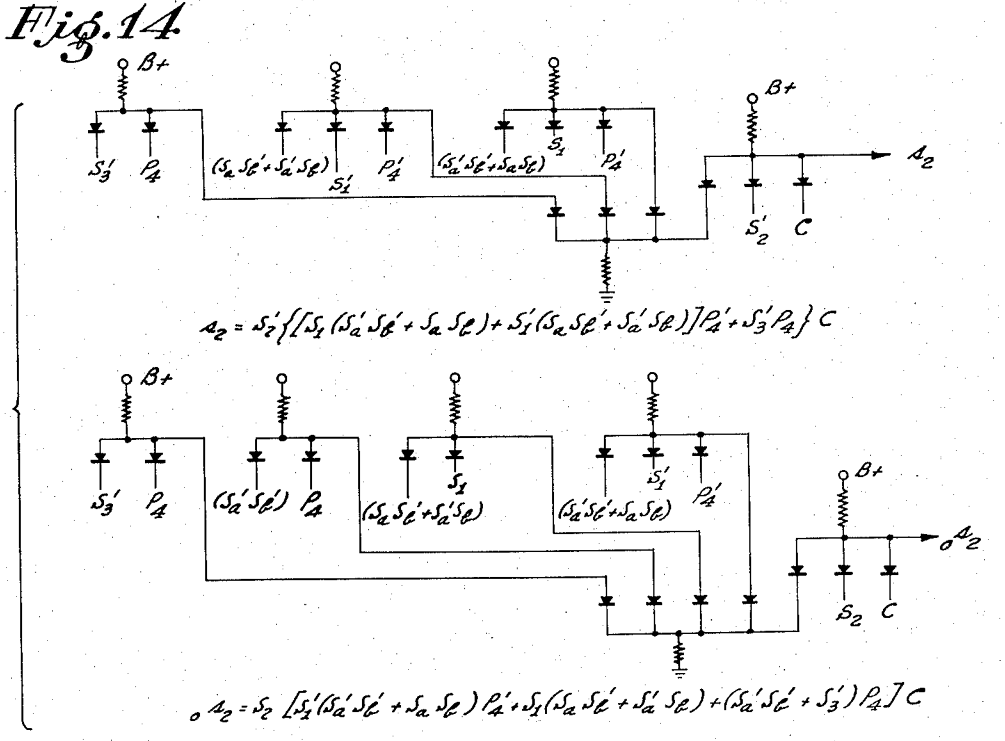
Fig. 14 shows a schematic circuit diagram of the grid input logical networks for the S2 flip-flop.

And a still further simplification, by the reasoning used in deriving the S1 flip-flop grid equations in Fig. 14, will give the expressions:

$$s_3=S_3'\{S_2(P_2+P_3)+[S_2(S_a+S_b+S_1')+S_1S_2'S_a'S_b']P_4\}C$$

$$_0s_3=S_3[S_2'P_4'+S_1S_2'(S_aS_b'+S_a'S_b)+S_2'S_a'S_b'+S_1'S_aS_bP_4]C$$

Figure 12:
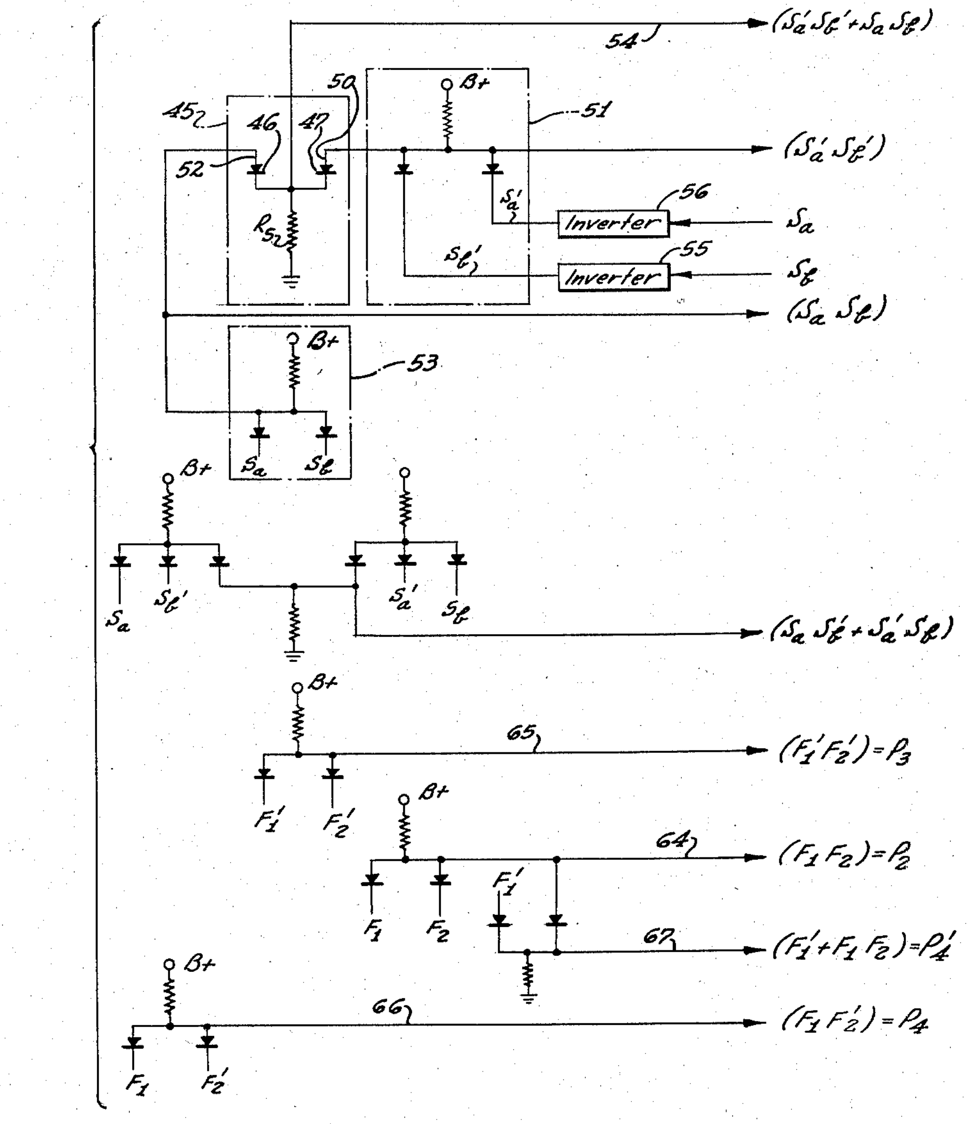
Fig. 12 is a schematic circuit diagram of the logical networks for generating complex propositions which are used a plurality of times in the summer circuits.

In obtaining the physical circuits for generating the logical equations needed for the grid inputs to the S counter flip-flops, it is noted that certain of the combinations of terms are used repeatedly in several equations. By generating each of these certain combinations once, a single derived proposition is available which can be introduced where needed with other terms to solve the various equations. In Fig. 12, the logical networks for generating these combinations of terms are shown.

It was previously shown and described in connection with Fig. 7 how the networks for physically realizing logical products are arranged.

The network for performing "logical addition" will be next described by reference to Fig. 12. This network, as shown by block 45, is comprised of a pair of input diodes 46 and 47 whose cathode-ends are joined and returned to ground through a common resistor $R_5$. The input terms to the network are fed in on the anode-ends of the diodes. Here, the input lead 50 represents the product $S_a'S_b'$ as obtained from the output of the first product network 51, and the input lead 52 represents the product $S_aS_b$ as obtained from the output of the second product network 53. When either one, or both, of the input leads to logical addition network 45 is relatively high in potential, output line 54 is raised to a relatively high potential indicative of the logical sum $(S_a'S_b'+S_aS_b)$. Thus in general it can be stated that in a logical addition network, irrespective of the number of inputs, the output potential equals the highest input potential.

It should be understood that the inputs $S_a$ and $S_b$ are here shown to be fed through inverters 55 and 56, respectively, so as to obtain their logical inverse $S_a'$ and $S_b'$, which are needed as terms in the equations. The actual source of $S_a'$ and $S_b'$ could, however, be obtained from the false outputs of, say, flip-flops *Sa* and *Sb*, respectively, if such a source were used for the incoming coded digits.

The diode networks provided for solving the remaining combinations are comprised of similar logical product and logical sum circuits. In each case, the output line is designated by the symbolic function which it represents.

Figure 15:
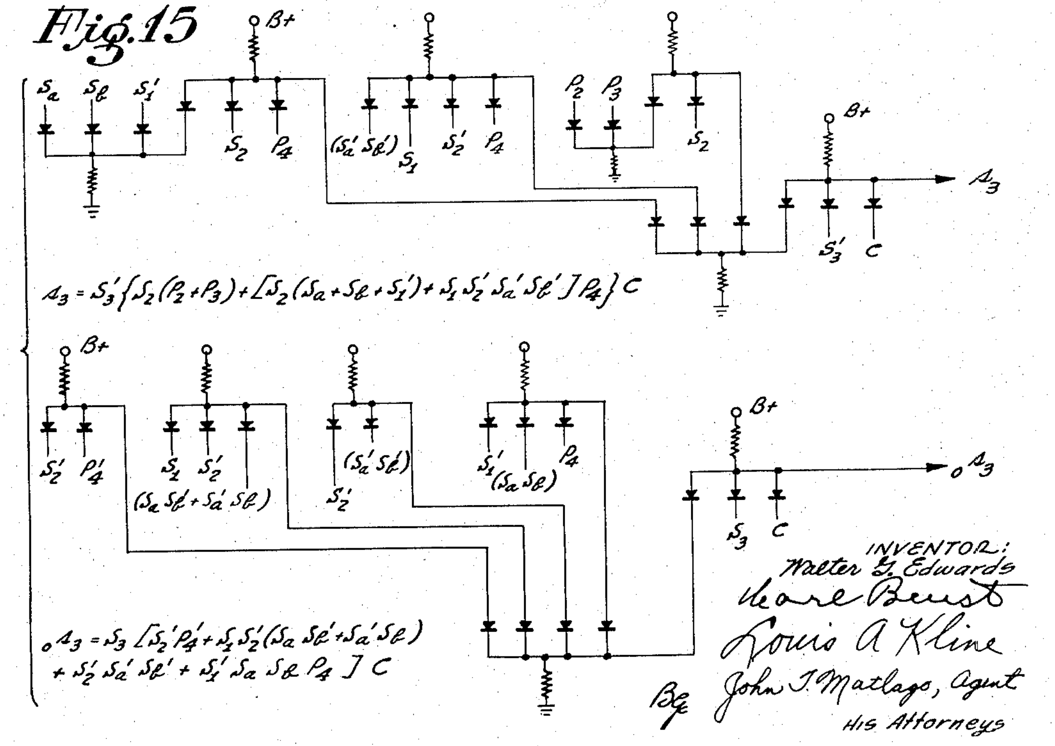
Fig. 15 shows a schematic circuit diagram of the grid input logical networks for the S3 flip-flop.

In Figs. 13 through 15, the logical networks for physically solving the triggering equations for the S1, S2, S3, and S4 flip-flops are shown. In each case, the logical equation for either the true or false grid of the flip-flop is written below the network which, in effect, solves it. It should be noted that the inputs to the networks which are defined by symbolic functions represent the complex terms already generated by the network in Fig. 12. The output from the logical network, in each case, is obtained from a final logical product circuit which includes among other possible common terms, a clock pulse.

Figure 16:
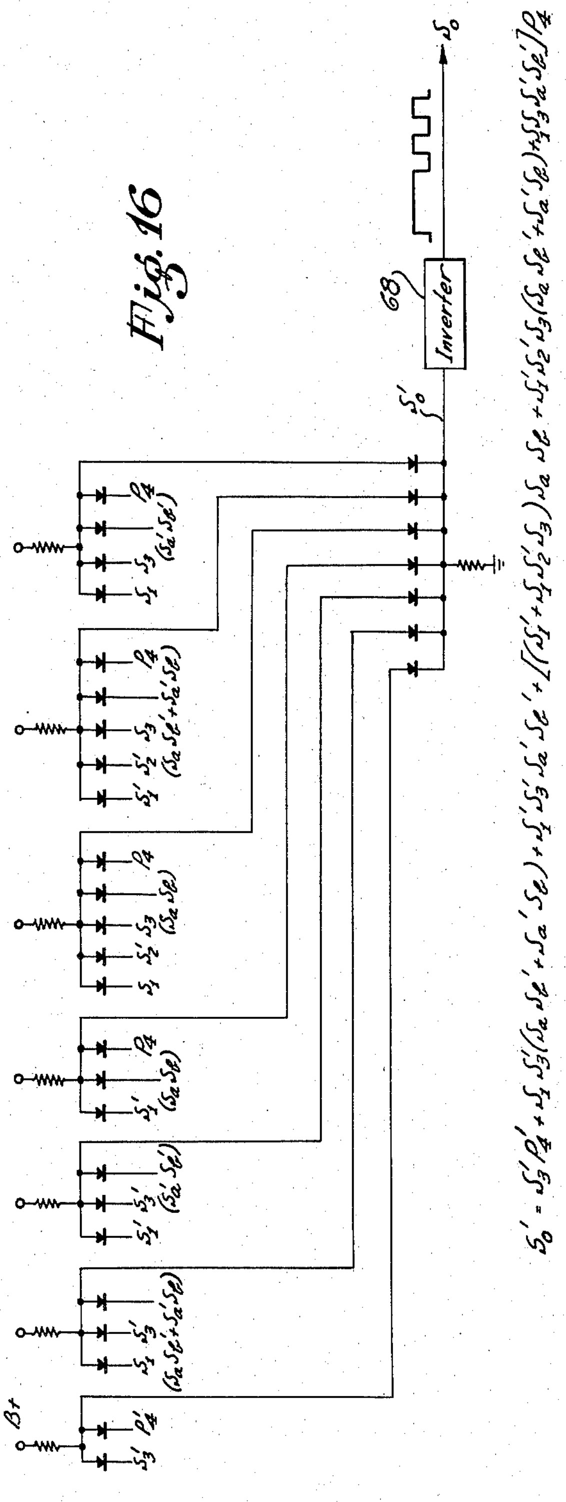
Fig. 16 shows a schematic circuit diagram of the output logical networks for generating the voltage waveform representative of the sum.

In Fig. 16, the logical circuit for generating the logical negative of the sum output waveform $S_0'$ is presented. By feeding the $S_0'$ logical network output into an inverter 68, which may be an amplifier, for example, the desired waveform $S_0$ can be obtained.

Here the output is not combined with a clock pulse, as was each of the grid equations, since the output is not being used to trigger a flip-flop.

This output wave can be fed, for example, into a memory or may be observed by means of an oscillograph, depending on how the summer circuit fits into the remaining system of a computer.

*Operation*

Returning to Fig. 1, the operation of the summing circuit 10, upon receiving the coded digits there shown, will next be described in detail.

The content of the summer is initially zero, i. e., the summer flip-flops S1, S2, and S3 are all in the "zero" state. Upon receipt of the unit input (high potential) present on $S_b$ during the $P_1$ pulse period of the first cycle, the circuits are set up so as to trigger the S2 flip-flop to the "one" state, and to permit the S1 flip-flop to remain in the "zero" state at the end of the $P_1$ pulse period. The summer flip-flops, as evaluated during this time (Table IV, Fig. 9), contain the partial decimal sum of 1. During the $P_2$ pulse period of the first cycle, two-unit inputs are shown to be present on both $S_a$ and $S_b$. As a result of this, at the end of the $P_2$ period, the S3 flip-flop is triggered into a "one" state, the S2 flip-flop is triggered into a "zero" state, and the S1 flip-flop is triggered into a "one" state. The summer flip-flops, as evaluated at this time (Table V, Fig. 10), thus record a partial decimal sum of 5.

During $P_3$ pulse period, the first output pulse, weighted one, is read out. Also during the $P_3$ pulse period, four-unit inputs are present on both $S_a$ and $S_b$; and, as a result of receiving these inputs, the S3 flip-flop is triggered into a "zero" state, the S2 flip-flop is triggered into a "one" state, and the S1 flip-flop is also triggered into a "one" state. As seen from Table VI, Fig. 11, these states of the flip-flops, i. e., "zero," "one," and "one" for flip-flops S3, S2, and S1, respectively, represent a partial decimal sum of 12 in the summer as evaluated during the $P_4$ pulse period.

During the $P_4$ pulse period, weight 2 components of the coded digits are again received. As shown in Fig. 1, only one of these, $S_a$, is received at this time.

It should be noted that the inputs during the $P_4$ pulse period are never recorded as a count in the summer. At this time, since all the components of the incoming digits have been observed, all the remaining components of the outgoing digit can be determined.

Thus by noting what the total observed count is, the following decisions are made during the $P_4$ pulse period: (1) The existence of the second component of the output, weighted 2, is determined and fed out; (2) the existence of the third component of the output, weighted 4, is determined and stored in the S3 flip-flop at the end of this time; (3) information determining the nature of the fourth output pulse, weighted 2, is stored in the S2 flip-flop; and (4) the decimal "carry," for total decimal sums of 10 to 19, inclusive, from the first summation cycle, is stored at the end of this time in the S1 flip-flop.

In the present example, during the $P_4$ pulse period, the summer content 12 (Table VI, Fig. 11), plus the unit output read out during the $P_3$ pulse period, together with the observed input $S_a$, weighted 2, gives a total decimal sum of 15. This means a coded binary number (Table I, Fig. 2) equivalent to the decimal 5 is to be fed out and a decimal "carry" is to be added to the following incoming digits.

As shown in Fig. 2, the second component of the outgoing coded digit representing 5 is absent. Hence, in accordance with the output logical network previously described, a low potential is fed out during the $P_4$ pulse period from the summer. The third component, weighted 4, is present in the output. The S3 flip-flop is therefore triggered "one." Lastly, the fourth output potential, again weighted 2, is seen to be absent. Since, as previously explained, the fourth output potential is also read from the S3 flip-flop, the S3 flip-flop must be changed from "one" to "zero" at the end of the following $P_1$ pulse period. This information is stored in the S2 flip-flop at this time; therefore, the S2 flip-flop is triggered to the "zero" state at the end of the $P_4$ pulse period.

During the $P_1$ pulse period of the next cycle of operation, the third output component, weighted 4, is read out from the S3 flip-flop. At the end of the $P_1$ pulse period, the S3 flip-flop is triggered "zero" as a result of the "zero" state of the S2 flip-flop. The fourth output component, in this case a low potential, is fed out from the S3 flip-flop during the following $P_2$ pulse period. The S1 and S2 flip-flops, having performed their function as storage units from the previous cycle, are used as counters again at the end of the $P_1$ pulse period. The S3 flip-flop, having supplied the fourth output component during the $P_2$ pulse period, is used as a counter in conjunction with flip-flops S1 and S2 at the end of the $P_2$ pulse period.

This completes one cycle of the summer circuit showing how the first binary-coded-decimal input digit 8 received on $S_a$, when added to the first binary-coded-decimal input digit 7 received on $S_b$, gives the first binary-coded decimal output digit 5. The following binary-coded-decimal input digits 6 and 2 on $S_a$ and $S_b$, respectively, together with the decimal "carry," resulting from the previous summing cycle, cause the summer to feed out the second binary-coded-decimal output digit 9.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore claimed in embodiment of various forms all coming within the scope of the claims which follow.

What is claimed is:

1. A summing circuit for generating an outgoing coded number which is the sum of a pair of incoming coded numbers comprising: a pair of input lines, each serially receiving binary signals representing one of said incoming numbers, a group of four binary signals on an input line representing each of the digits of said numbers, each of the four successive binary signals in a group weighted to correspond to the components 1, 2, 4, and 2, respectively; a first, second, and third bistable state circuit successively actuated to function as stages of a binary counter, each of said bistable state circuits representing a progressively higher order binary stage on receipt of successive signals of the incoming groups; a first circuit means connected to said bistable state circuits and successively responsive to the first three binary signals in the groups representing the same order coded digits of the incoming numbers for registering information in said bistable state circuits concerning their combined weight count; an output line; and a second circuit means connected to said bistable state circuits and responsive to information registered therein and the third and fourth binary signal in said incoming groups for generating on said output line a group of binary signals representing the same order coded digit of the outgoing number.

2. A summing circuit for generating an outgoing coded number which is the sum of a pair of incoming coded numbers comprising: a pair of input lines, each serially receiving binary signals representing one of said incoming numbers, a group of four binary signals on an input line representing each of the digits of said numbers, each of the four binary signals in a group weighted to represent components of said coded digits; a first, second, and third bistable state circuit; a first circuit means connected to said bistable state circuits and successively responsive to the first three binary signals in the groups representing the same order coded digits of the incoming members for registering information in said bistable state circuits concerning their combined weight count, said first circuit means arranged such that each of said bistable state circuits represents a progressively higher order stage of a binary counter on receipt of successive binary signals on said input lines; an output line; a second circuit means for generating on said output line while the third binary signals of the groups are being received the first binary signal of a group representing the coded digit of the outgoing number as stored in one of said bistable state circuits; and a third circuit means connected to said bistable state circuits and responsive to information registered therein and the fourth binary signals of said groups for deriving the last three binary signals of the outgoing coded digit to be generated on said output line, said latter circuit means including means for storing the last two binary signals of the outgoing coded digit in said bistable state circuits prior to generating them on said output.

3. A summing circuit for generating an outgoing coded decimal number which is the sum of a pair of incoming coded decimal numbers comprising: a pair of inputs, each serially sensing binary signals representing said incoming numbers, a group of four binary signals on an input representing each of the decimal digits of said number, each of the binary signals in a group weighted to represent components of the decimal digit; a first, second, and third bistable state circuit successively actuated to function as stages of a binary counter, each of said bistable state circuits representing a progressively higher order stage of the binary counter on receipt of successive binary signals of the incoming groups; a first circuit means for registering in said bistable state circuits the combined weight count of the first three binary signals in the groups representing the same order decimal digits of the incoming numbers, said circuit means being the same for the first three binary signals; a second circuit means responsive to the binary signals in said groups and the registered information in said bistable state circuits for deriving a group of outgoing binary signals representing the decimal digit of the outgoing number; an output for serially emitting the outgoing binary signals; and a third circuit means for registering in said second and third bistable state circuits the last two binary signals of the outgoing group prior to impressing them onto said output.

4. A serial summer circuit comprising: means for receiving a first and second incoming number each said number formed of sets of serially received binary signals which represent decimal digits, each of said sets comprised of four digital periods each weighted to respectively correspond to components 1, 2, 4, and 2 of the decimal digits; a first, second, and third bistable state circuit;

means for registering in said bistable state circuits at the end of each of said first three digital periods an accumulated binary weight count of the binary signal inputs, said means for registering arranged such that each said bistable state circuit represents a progressively higher order stage of a binary counter on successive digital periods; means for generating during the third digital period the first binary signal of an output set representing the decimal digit of the sum, said first binary signal corresponding to the content of the first stage of the binary weight count; means for generating during the fourth digital period the second binary signal of said output set in response to the accumulated count binary signals and the incoming binary signals; further means for generating during the fourth digital period the third and fourth binary signals of said output set in response to the accumulated count binary signals and the incoming binary signals and causing said binary signals to be stored in said second and third bistable state circuits; and means for feeding out said third and fourth binary signals of said output set in order during the first two digital periods associated with the following incoming sets of binary signals.

5. A serial summer circuit comprising: means for receiving and feeding into said summer circuit a first and second incoming number formed of groups of serially disposed binary signals which are coded to represent digits of a decimal system, each of said groups composed of four digital positions each weighted to correspond to components of the decimal digit; a source of clock pulses, said binary signals being synchronized in time with said clock pulses; means counting said clock pulses for generating signals defining first, second, third, and fourth timing periods in repeated cycles corresponding to the position of the binary signals in a group; a first, second, and third bistable state circuit successively actuated to function as stages of a binary counter, each of said bistable state circuits representing a progressively higher order stage of a binary counter on successive timing periods; circuit means associated with said bistable state circuits for registering therein at the end of the first three timing periods a binary count of said binary input signals in accordance with their weight; output circuit means for feeding out during said third timing period the first output binary signal as stored in the bistable state circuit corresponding to the first stage of the binary counter, and for feeding out during said fourth timing period the second output binary signal obtained by responding to the count in said bistable state circuits and the input binary signals; storing circuit means responsive to the contents of said bistable state circuits and the incoming binary signals during the fourth timing period for storing in said bistable state circuits at the end of said fourth timing period the third and fourth output binary signals; and further circuit means for feeding out said stored output binary signals one at a time during the first two timing periods of the following cycle.

6. A serial summer circuit comprising: means for receiving and feeding into said summer circuit a first and second incoming number formed of groups of serially disposed binary signals coded to represent decimal digits; each of said groups composed of four digital positions, each weighted to correspond to the decimal components 1, 2, 4, and 2, respectively; a source of clock pulses, said digital positions synchronized in time with said clock pulses; means for counting said clock pulses for indicating in repeated cycles a first, second, third, and fourth timing period related to said digital positions; a first, second, and third bistable state circuit successively actuated to function as stages of a binary counter, each said bistable state circuit representing a progressively higher order stage on successive timing periods, each of said bistable state circuits having a pair of output leads indicating the states thereof and a pair of trigger inputs for controlling the states thereof; a logical circuit responsive to said clock pulse counting means for connecting the output leads of said bistable state circuits and the summer receiving means to the trigger inputs of said bistable state circuits in accordance with a predetermined arrangement; said logical circuits including: a first trigger circuit means operating to register a binary weight count of the incoming binary signals in the first and second bistable state circuits at the end of said first timing period and in all of the bistable state circuits at the end of said second and third timing periods; an output line; a first output circuit means operating during said third timing period to feed onto said output line a first binary signal of a group representing the decimal digit of an outgoing number as stored in the third bistable state circuit; a second output circuit means operating during said fourth timing period to feed a second binary signal onto said output line in response to the accumulated binary count and the incoming binary signals; a second trigger circuit means operating during said fourth timing period in response to the accumulated binary count and the incoming binary signals to store in the second and third bistable state circuits the third and fourth output binary signals, and to store in the first bistable state circuit a decimal carry signal; and a third output circuit means operating during the first and second timing periods, respectively, of the succeeding timing cycle to feed said stored third and fourth binary signals onto said output line.

7. An electronic digital serial adder for adding together pairs of binary coded numbers, each coded integer of said numbers being expressed as a sequence of four binary digits, each digit being assigned a predetermined weighted value in accordance with its position in the sequence including a timing signal source adapted to generate a continuously recurring cycle of four timing signals comprising: first, second and third bistable state devices arranged to constitute a binary digit register and a logical network adapted to be supplied with said timing signals and provided with a pair of input lines adapted to be simultaneously supplied each with a sequence of four binary signals indicative of corresponding integers of the coded numbers, each binary signal being synchronized with a timing signal of said cycle, said network including first, second, third and fourth logical circuitry, the first circuitry being responsive to the first three weighted binary signals of the corresponding integers so as to generate output signals at the end of each of the first three timing signal periods, said output signals causing the binary digit register to register in true binary form the sum of the first three weighted binary digits, the second logical circuitry being responsive to an output signal from the bistable state device storing the lowest order true binary digit during the third timing signal period so as to generate the first output weighted binary digit of the sum on an output line from the logical network, the third logical circuitry being responsive to output signals from the bistable state devices indicative of the partial sum stored therein during the fourth timing signal period and to input signals indicative of the fourth weighted binary digits so as to generate the second output weighted binary digit of the sum on said output line, and the fourth logical circuitry being responsive to signals indicative of the partial sum stored in the binary digit register during the fourth timing signal period and to input signals indicative of the fourth binary digits so as to generate output signals causing the second and third bistable state devices to register the fourth and third weighted binary digits, respectively, of the sum and causing the first bistable state device to register any carry resulting from the addition of the corresponding integers and being responsive to output signals from the register during the first and second periods of the succeeding timing signal cycle so as to generate the third and fourth weighted binary digits of the sum on the output line.

8. An electronic digital serial adder according to claim 7, wherein the first logical circuitry and the three bistable state devices are interconnected such that the output signals generated by said first logical circuitry at the end of the first timing signal period, in response to the signals indicative of the first weighted binary digit, cause the first bistable state device to register a true binary digit of the order $2^1$ and the second bistable state device to register a true binary digit of the order $2^0$, the output signals generated by the first logical circuitry at the end of the second timing signal period, in response to the signals indicative of the second weighted binary digit, cause the third bistable state device to register a true binary digit of the sum of the order $2^0$, the second bistable state device to register the binary digit of the order $2^1$ and the first bistable state device to register a true binary digit of the order $2^2$, and the output signals generated by the first logical circuitry at the end of the third timing signal period, in response to the signals indicative of the third weighted binary digit, cause the third bistable state device to register a true binary digit of the order $2^1$, the second bistable state device to register a true binary digit of the order $2^2$ and the first bistable state device to register a true binary digit on the order $2^3$, and wherein the second and third bistable state devices are effectively arranged as a shifting register at the end of the fourth timing period, the third and fourth weighted binary digits of the sum, stored in the third and second devices respectively, being supplied to the fourth logical circuitry from the third device during the first and second timing periods of the succeeding cycle.

9. An electronic digital adder according to claim 7, wherein the triggering input potentials for controlling the states of the three bistable state elements are derived from the same circuit of the logical network during the first three of every four timing signal periods.

References Cited in the file of this patent

UNITED STATES PATENTS

| | | |
|---|---|---|
| 2,634,052 | Bloch | Apr. 7, 1953 |
| 2,705,108 | Stone | Mar. 29, 1955 |
| 2,775,402 | Weiss | Dec. 25, 1956 |

FOREIGN PATENTS

| | | |
|---|---|---|
| 1,030,471 | France | Mar. 11, 1953 |
| 1,043,321 | France | June 10, 1953 |
| 1,044,678 | France | June 24, 1953 |

OTHER REFERENCES

Electronic Engineering "Serial Digital Adders for a Variable Radix of Notation" by Townsend, October 1953, pages 410–416.

UNITED STATES PATENT OFFICE

Certificate of Correction

Patent No. 2,874,902 February 24, 1959

Walter G. Edwards

It is hereby certified that error appears in the printed specification of the above numbered patent requiring correction and that the said Letters Patent should read as corrected below.

Column 9, line 5, for "flip-flop" read —flip-flops—; line 21, for "$B_b$" read —$S_b$—; column 11, lines 12, 13 and 14, beginning with the words "pulse period" and ending with the words "first output", should read as follows instead of as in the patent:

> pulse period (i. e., at the end of the $P_1$ pulse period) whether the final decimal sum digit will have an odd or an even value. The potential representative of the first output column 12, line 12, for "flop-flop" read —flip-flop—; line 61, extreme left-hand portion of the formula, for "$s_2$" read —$s_3$—; column 13, line 29, for "inslusive" read —inclusive—; column 14, line 46, strike out "the"; column 17, lines 5, 17 and 42, in the tabulations, heading to the second column thereof, in each occurrence, for "*Input*" read —*Inputs*—; lines 6, 18, and 44, in the tabulations, heading to the third column thereof, in each occurrence, for "*Logical equation*" read —*Logical equations*—; line 70, for "paritial" read —partial—; column 19, line 61, in the tabulation, heading to the third column thereof, for "*Logical equation*" read —*Logical equations*—; column 21, line 20, for $S_1(S_aS_b+S_a'S_b)+(S_a'S_b'+S_3')P_4]C$ read $S_1(S_aS_b'+S_a'S_b)+(S_a'S_b'+S_3')P_4]C$ column 24, line 25, for "members" read —numbers—.

Signed and sealed this 30th day of June 1959.

[SEAL]

Attest:
KARL H. AXLINE,
*Attesting Officer.*

ROBERT C. WATSON,
*Commissioner of Patents.*